United States Patent [19]

Okada et al.

[11] Patent Number: 5,787,123
[45] Date of Patent: Jul. 28, 1998

[54] RECEIVER FOR ORTHOGONAL FREQUENCY DIVISION MULTIPLEXED SIGNALS

[75] Inventors: Takahiro Okada, Chiba; Yasunari Ikeda, Kanagawa; Tamotsu Ikeda, Tokyo, all of Japan

[73] Assignee: Sony Corporation, Tokyo, Japan

[21] Appl. No.: 736,720

[22] Filed: Oct. 25, 1996

[30] Foreign Application Priority Data

Oct. 30, 1995 [JP] Japan .................................. 7-281228

[51] Int. Cl.$^6$ ............................ H04L 27/14; H04J 11/00
[52] U.S. Cl. ............................ 375/324; 375/326; 370/203; 370/210
[58] Field of Search ........................ 375/324, 330, 375/340, 260, 326; 370/203, 206, 208, 210

[56] References Cited

U.S. PATENT DOCUMENTS 5,471,464  11/1995  Ikeda ................................ 375/324
5,602,835  2/1997  Seki et al. .......................... 370/206
5,608,764  3/1997  Sugita et al. ....................... 375/260

*Primary Examiner*—Temesghen Ghebretinsae
*Attorney, Agent, or Firm*—Frommer Lawrence & Haug LLP; William S. Frommer

[57] ABSTRACT

In view of regenerating clock with higher accuracy even under the condition that frequency distortion is generated due to the frequency selective Rayleigh fading, the OFDM (Orthogonal Frequency Division Multiplexing) modulated signal is converted to the baseband OFDM signal in the multipliers and a phase difference between the phase of the carrier forming the OFDM signal and the phase of the carrier before one OFDM symbol is calculated in the differential decoding circuit. A phase error of the carrier is calculated on the basis of the phase difference of the carrier in the carrier regenerating circuit or clock regenerating circuit and the local oscillator to generate the carrier and the local oscillator to generate clock are respectively controlled on the basis of the phase error of a plurality of carriers among those forming the OFDM signal.

13 Claims, 27 Drawing Sheets

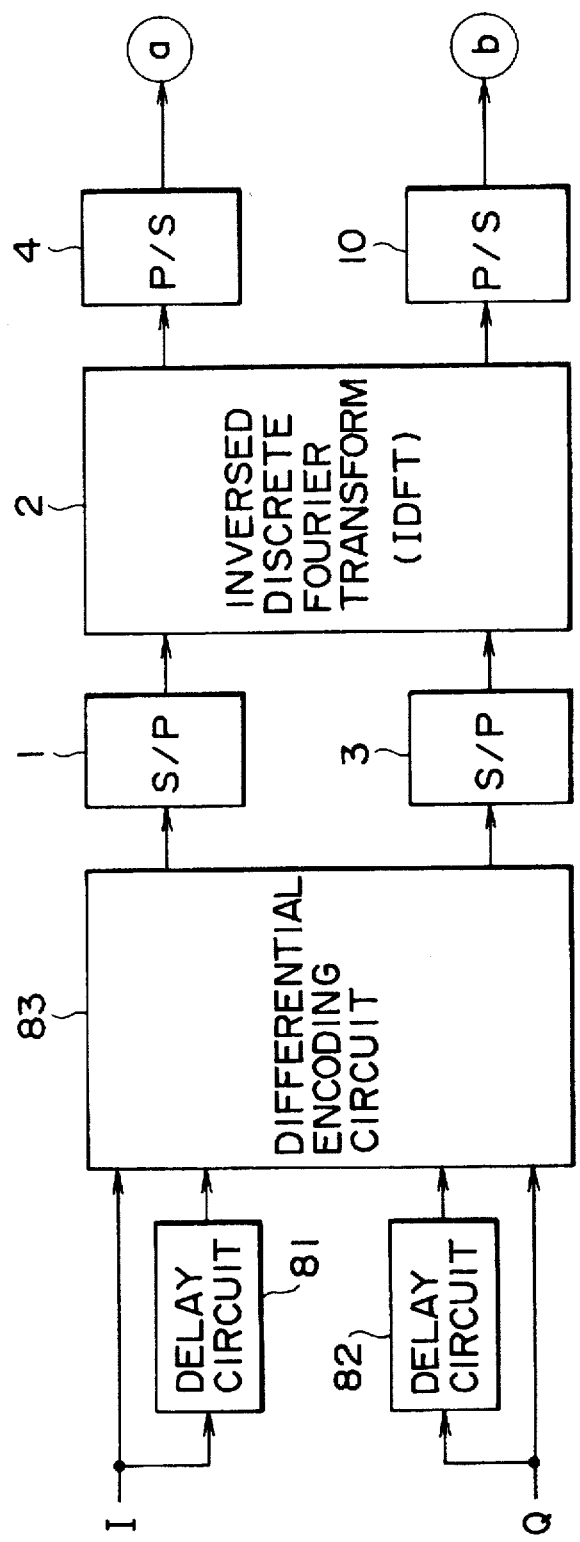

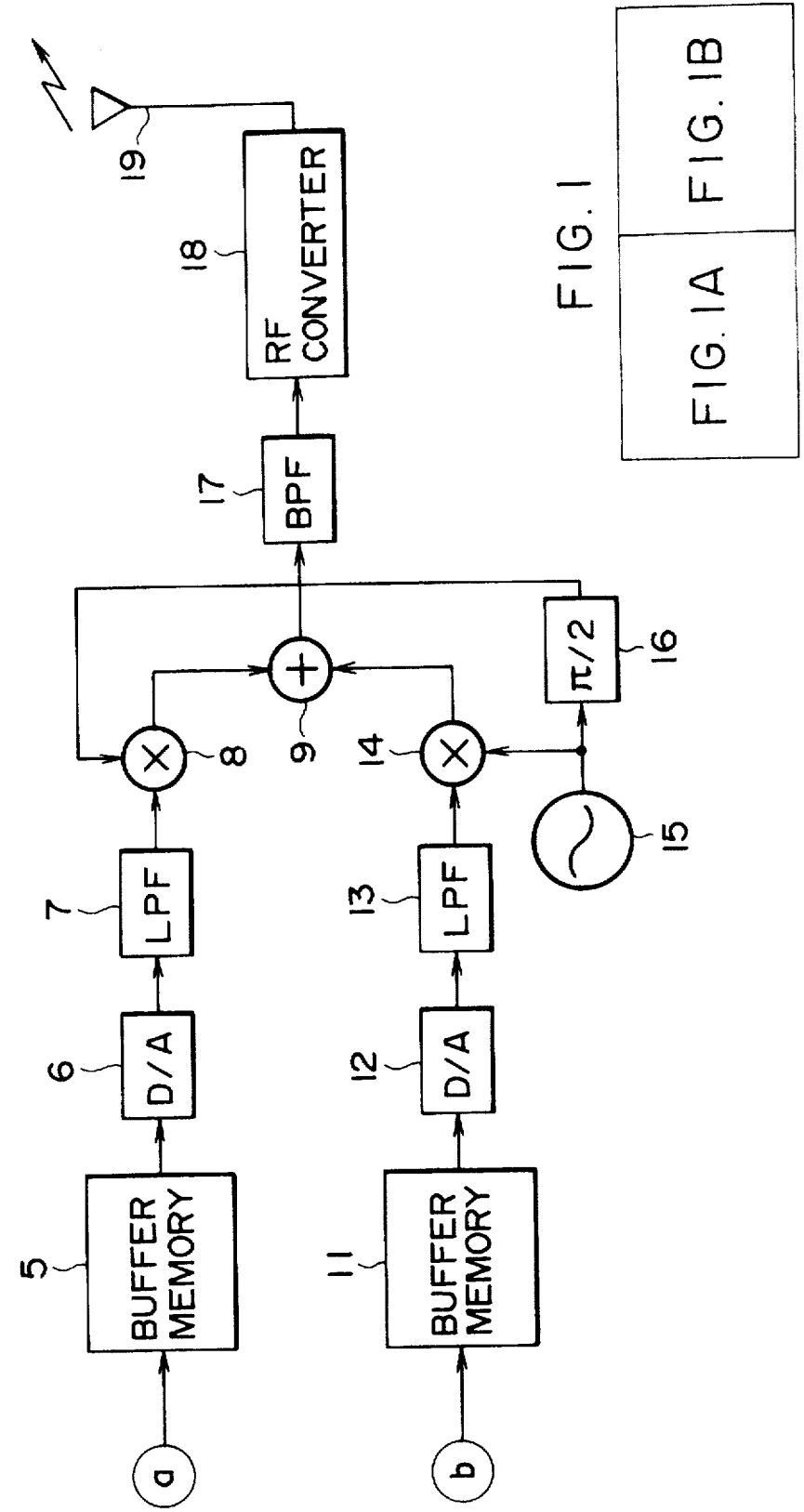

FIG. 3

| | | PRECEDING INFORMATION POINT | | | |
|---|---|---|---|---|---|
| | | J0 | J1 | J3 | J2 |
| | | 00 | 01 | 11 | 10 |
| PRESENT INFORMATION POINT | J0  00 | 00 | 01 | 11 | 10 |
| | J1  01 | 01 | 11 | 10 | 00 |
| | J3  11 | 11 | 10 | 00 | 01 |
| | J2  10 | 10 | 00 | 01 | 11 |

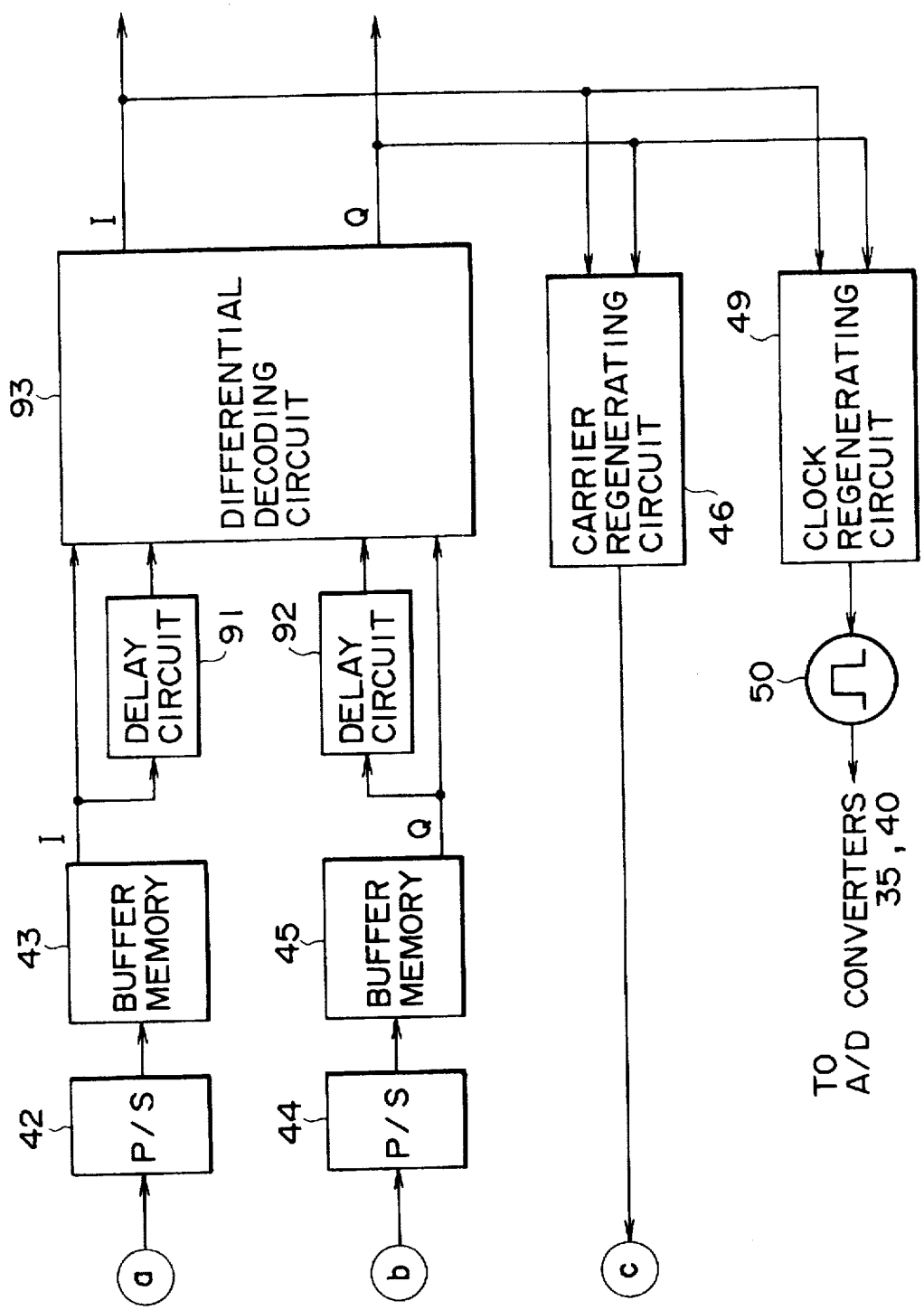

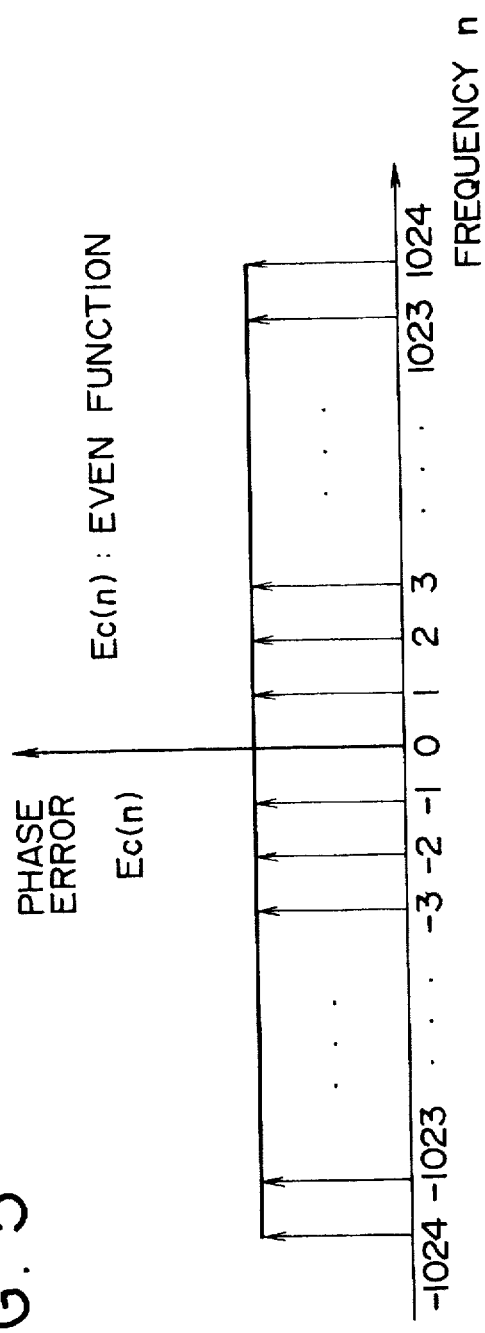
F I G. 5
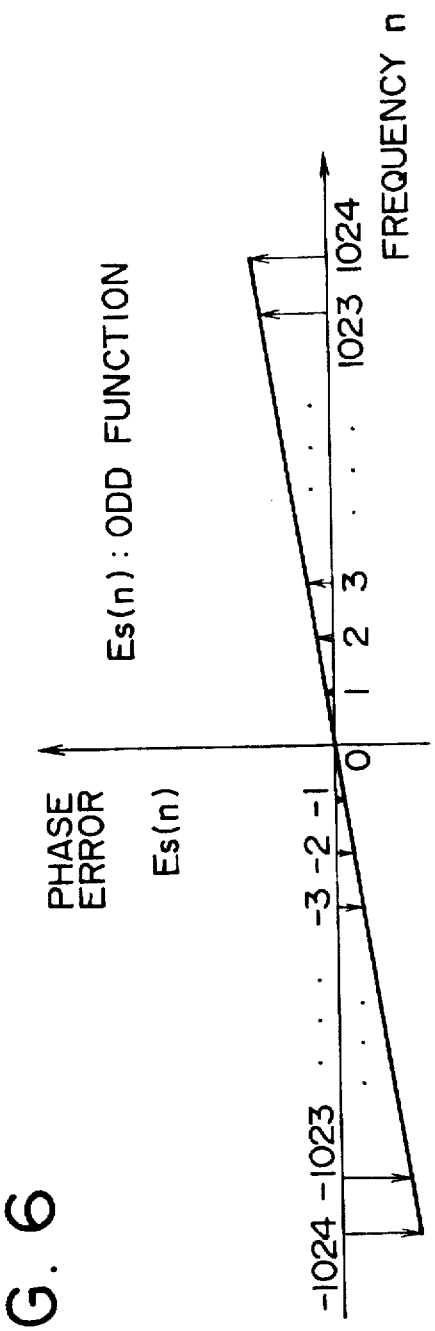
F I G. 6

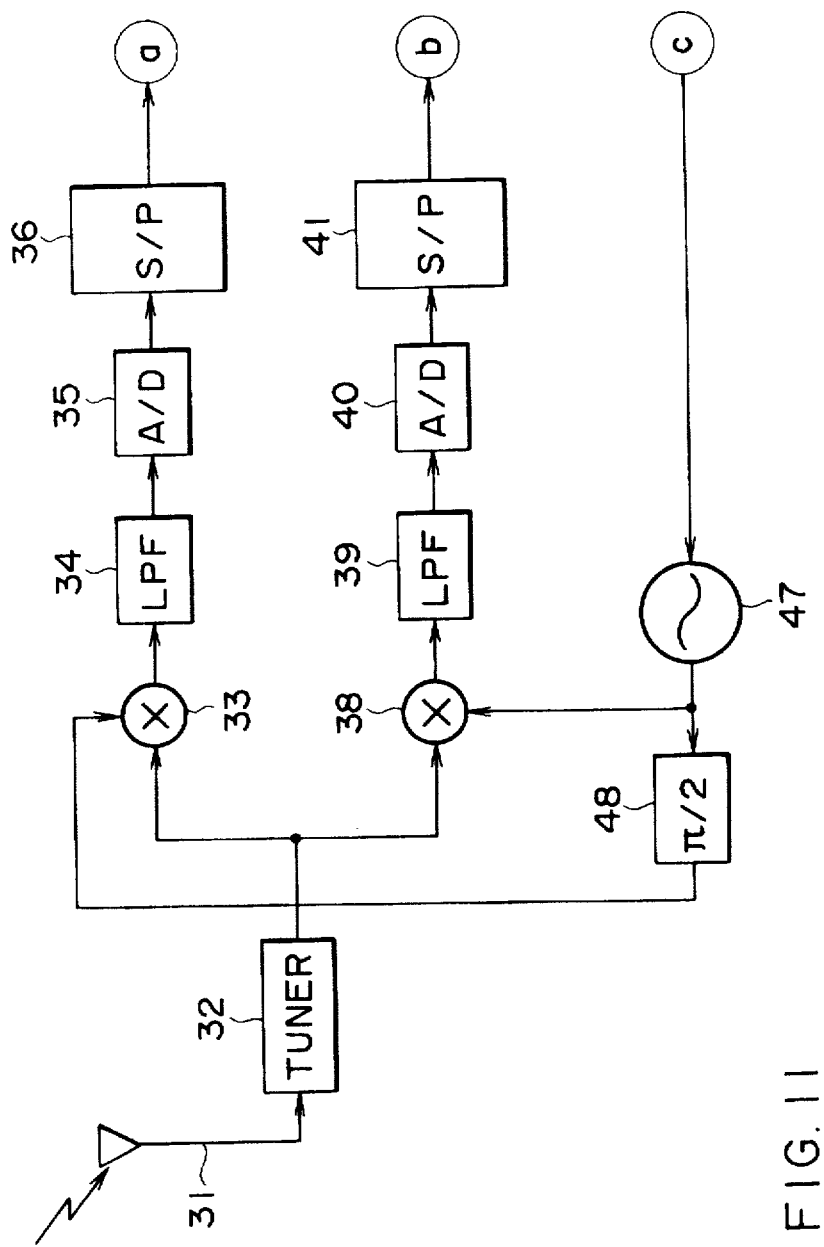

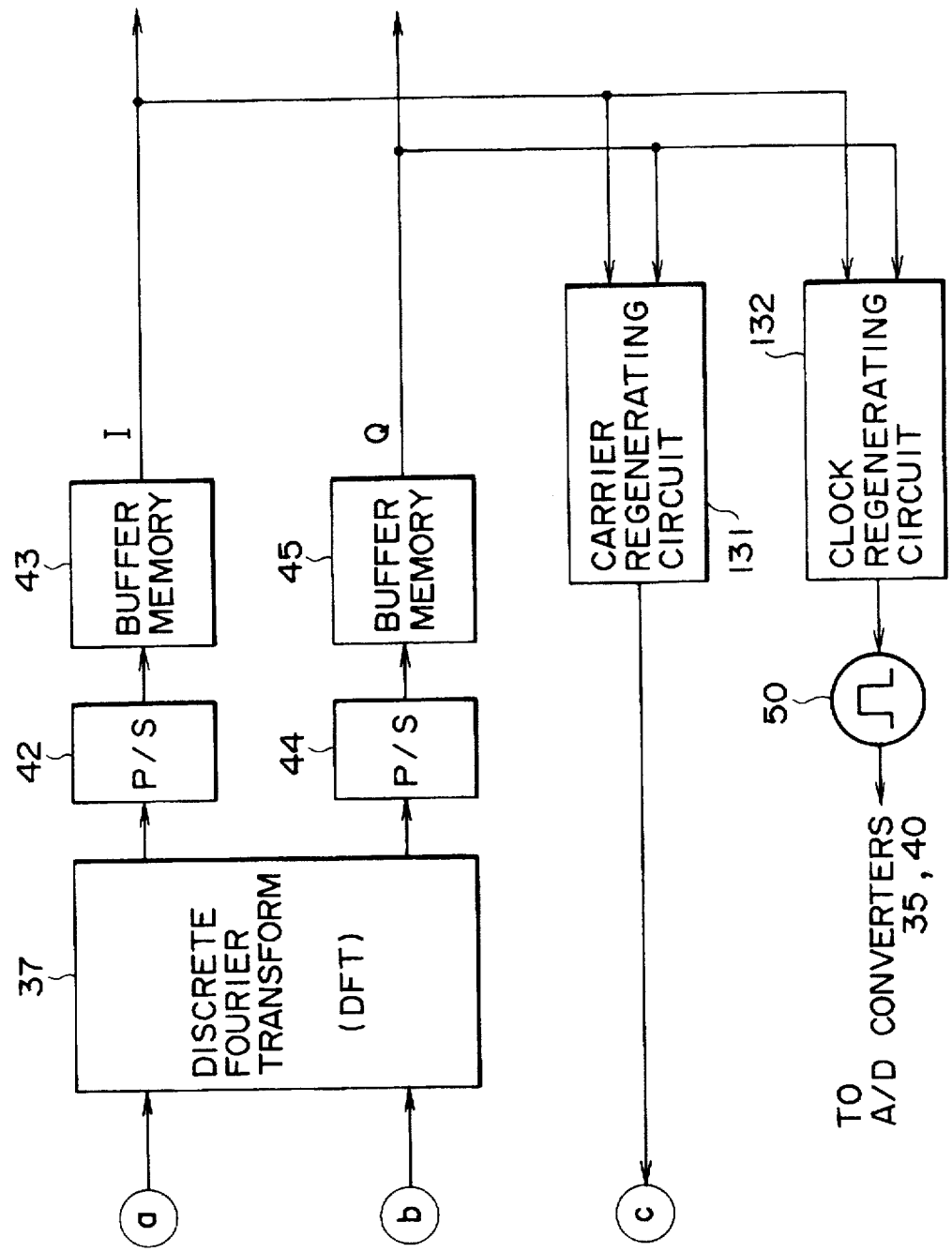

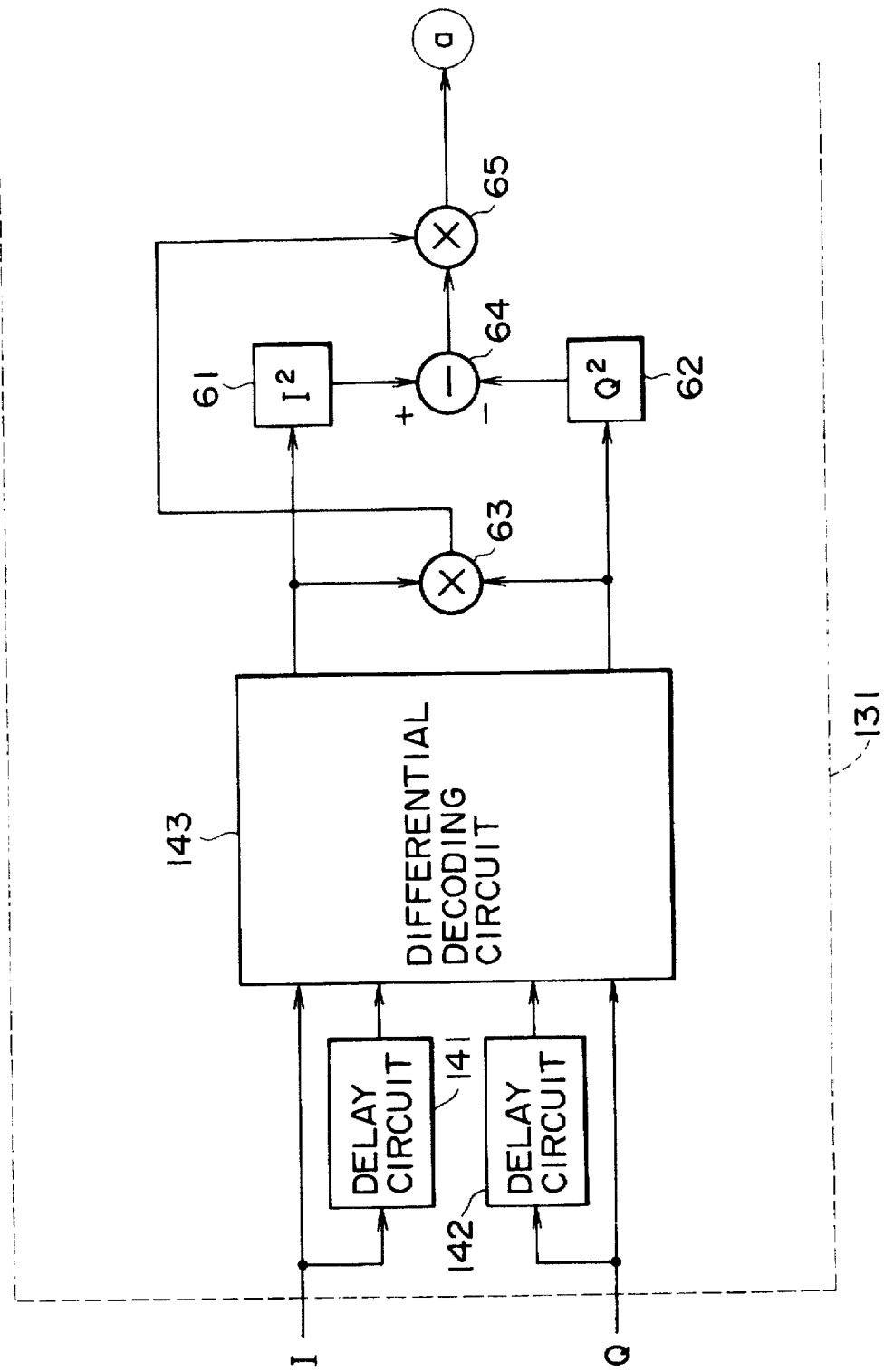

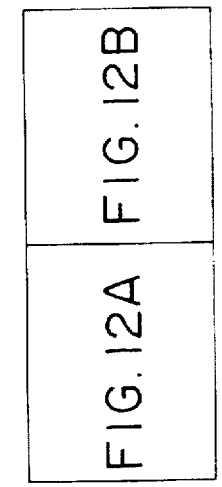
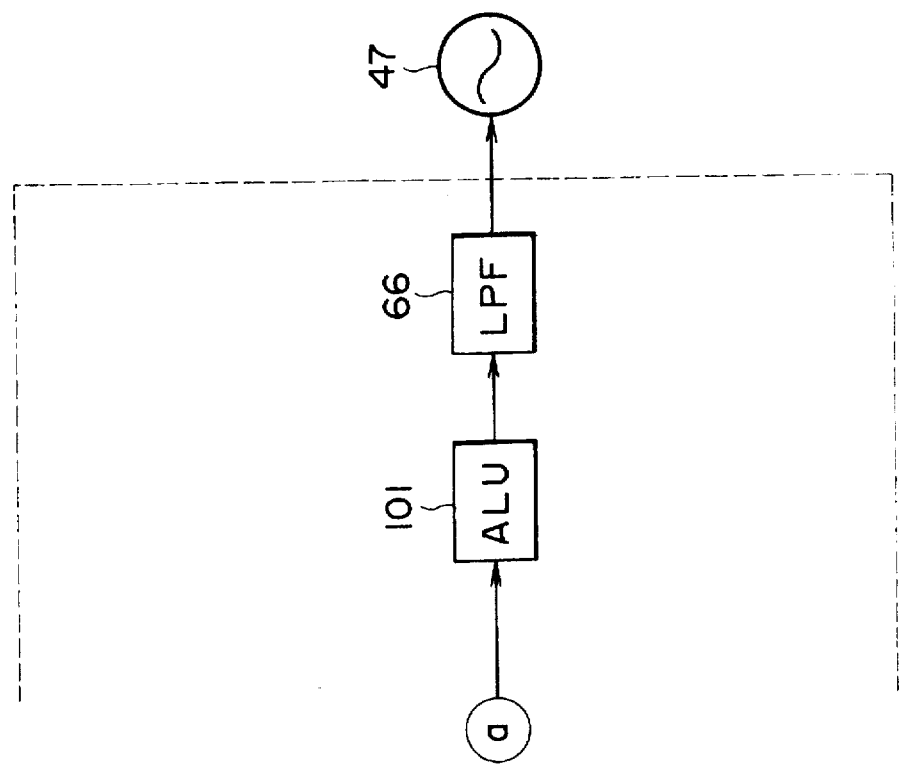

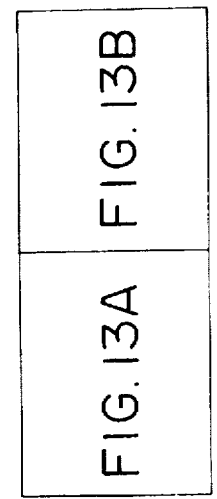
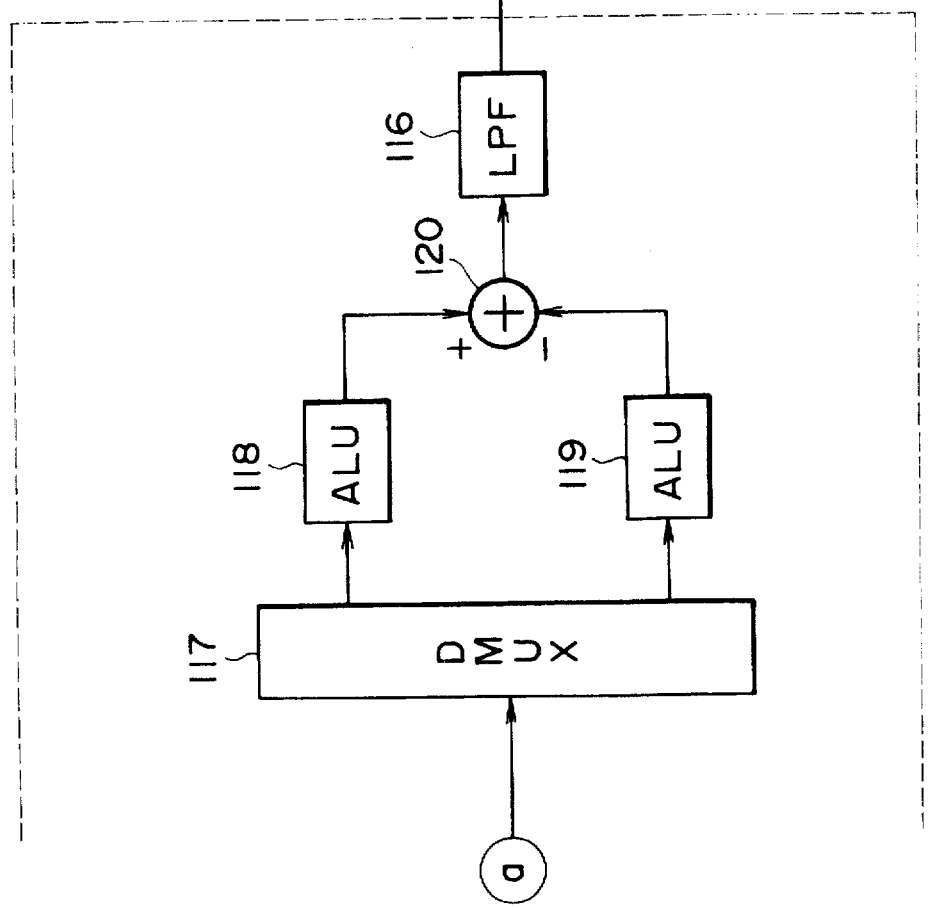

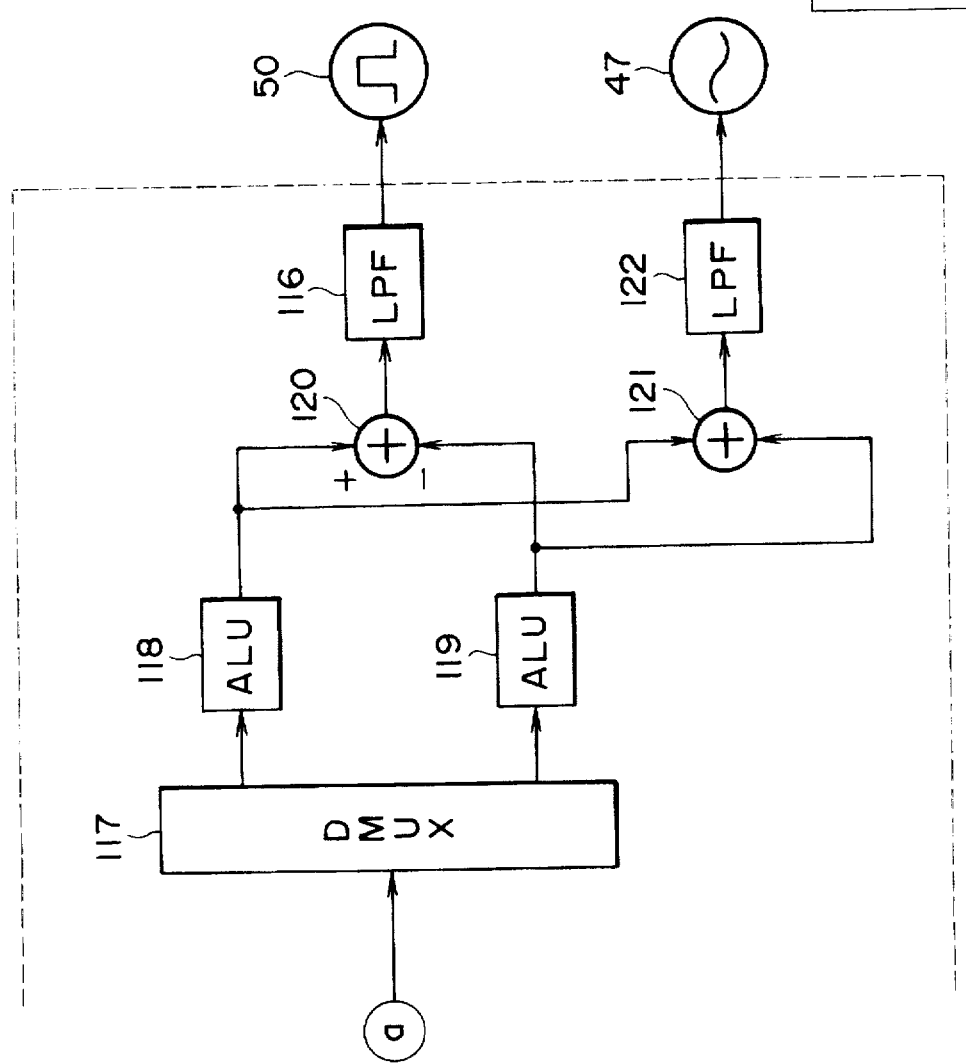

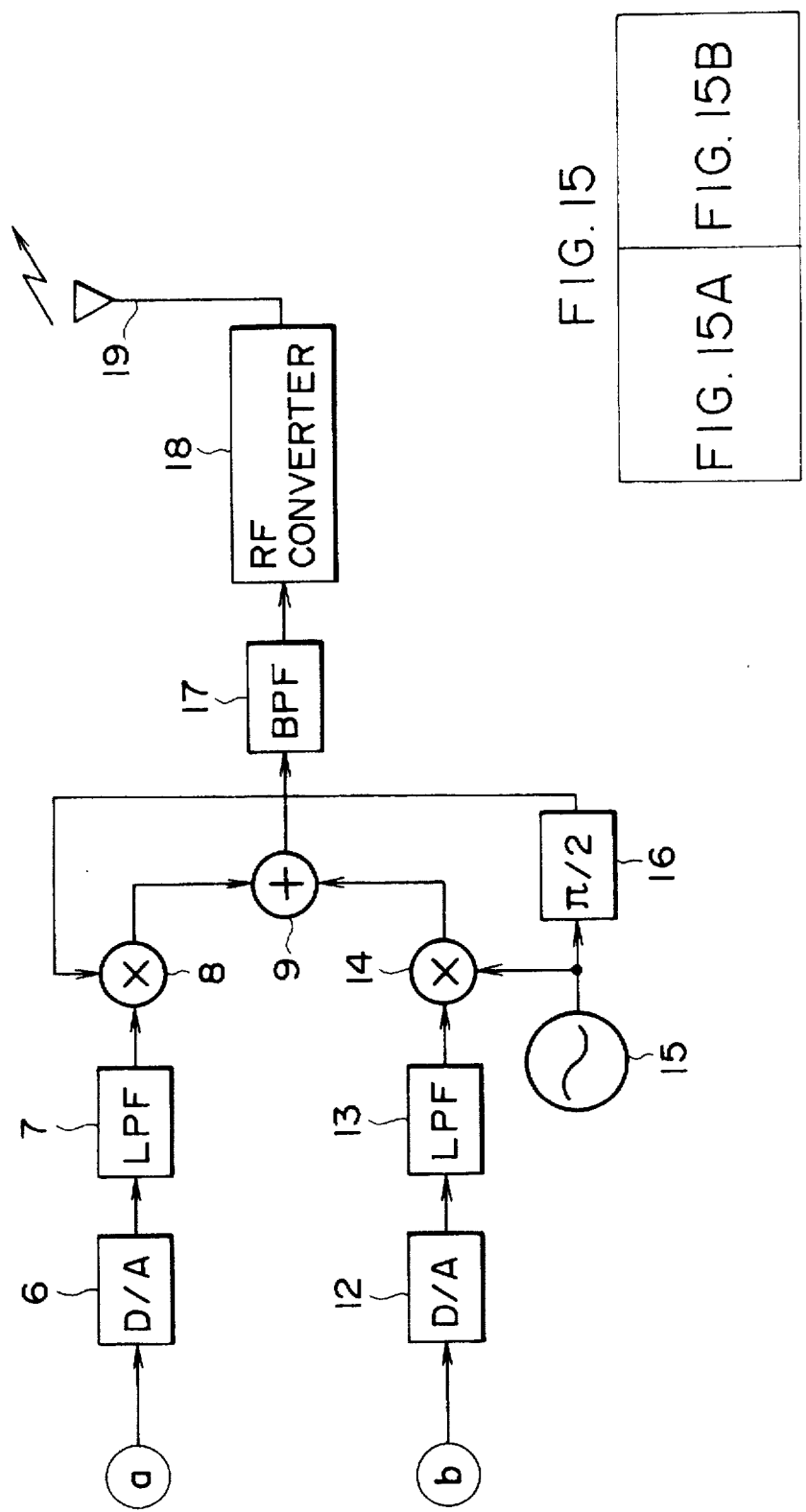

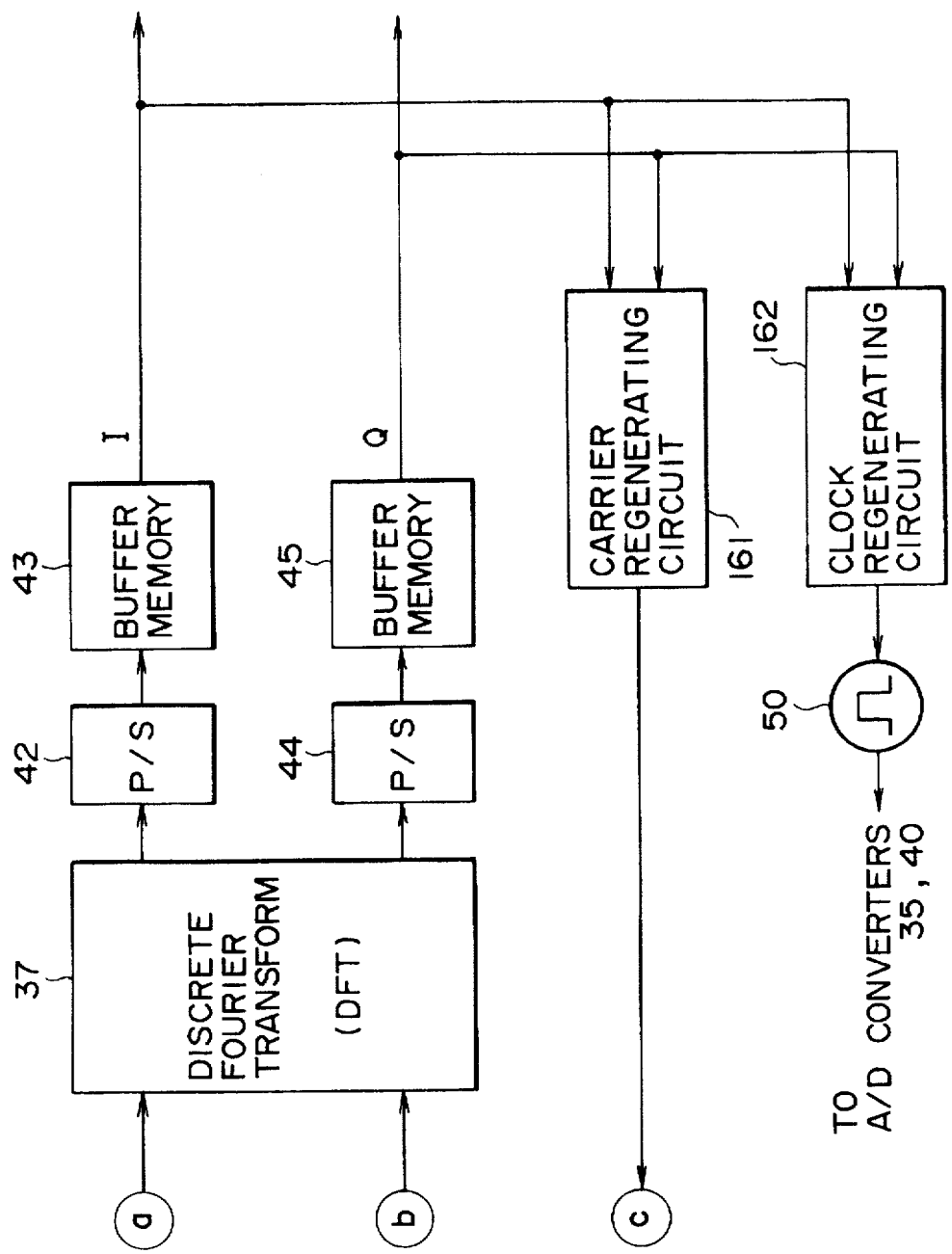

OFDM TRANSMITTING SPECTRUM

OFDM TRANSMITTING SPECTRUM RECEIVING FREQUENCY SELECTIVE FADING

RECEIVER FOR ORTHOGONAL FREQUENCY DIVISION MULTIPLEXED SIGNALS

BACKGROUND OF THE INVENTION

1. Field of the Invention

The present invention relates to a receiver and receiving method and particularly to a receiver and receiving method which is required for demodulation of the OFDM signal modulated by the OFDM (Orthogonal Frequency Division Multiplexing) system, for example, just suitable for use to reproduce the carrier or clock.

2. Description of Related Art

In the related arts, a carrier has been provided to transmit a digital signal and this digital signal has been modulated by changing at a high speed the phase and amplitude of this carrier depending on an input digital signal. As the system for changing only the phase (the digital signal as a series of information is assigned only to the phase), the phase modulation (PSK: Phase Shift Keying) system is known and as the system for changing both amplitude and phase (the digital signal as a series of information is assigned to both phase and amplitude), the quadrature (multilevel) modulation (QAM: Quadrature Amplitude Modulation) system is known.

As explained above, one carrier has been modulated in such a high speed as accommodating the carrier within the transmission frequency band, but recently a modulation system called the orthogonal frequency Division Multiplexing (OFDM) system has been proposed. In this OFDM system, many orthogonal carriers are provided within the transmission frequency band and these carriers are digital-modulated by the PSK and QAM system. According to this system, frequency band of one carrier becomes rather narrow because the transmission frequency band is divided with many carriers and thereby modulation rate is also lowered but since many carriers are used, total transmission rate is almost equal to that of the existing modulation system.

In this OFDM system, moreover, since many carriers are transmitted in parallel, a symbol rate is lowered and a relative time length of multipath for the time length of symbol can be shortened in the transmission path allowing existence of so-called multipath interference. Therefore, this system can be said as is resistive to the multipath interference and is therefore given the particular attention, because of such characteristic, as the system for transmission of digital signal by the ground wave intensively influenced by the multipath interference.

Moreover, with recent rapid progress of semiconductor technology, the hardware has realized the discrete Fourier transform and discrete inverse Fourier transform. Thereby, use of this technique has easily enabled modulation by OFDM system and, on the contrary, the demodulation. In addition, according to the OFDM system, since each carrier can be thought as receiving nonselective fading even under the environment of frequency selective fading, this OFDM system can be said to be suitable for mobile communication system.

Owing to such various advantages of the OFDM system, DAB (Digital Audio Broadcasting) has been proposed in Europe as the broadcast having used this OFDM system as the modulation system and the regular broadcast of DAB is scheduled to be started from the Autumn of 1995 in the United Kingdom.

The details of the signal processing by the OFDM system are disclosed, for example, in the "Digital Sound Broadcasting to Mobile Receivers" by Bernard Le Floch, Roselyne Halbert-Lassale, Damien Castelain, IEEE Transactions on Consumer Electronics, Vol. 35, No. 3, Aug. 1989, pp. 493–503.

FIG. 15 shows an example of structure of the transmitting apparatus of the related art utilizing such OFDM system. A pair of I or Q data as one symbol are respectively inputted simultaneously to a serial/parallel converter (S/P) 1 or 3 and are converted therein as the parallel data to be supplied to the inverted discrete Fourier transform (IDFT) 2. The inverted discrete Fourier transform 2 executes inverted discrete Fourier transform (IDFT) of the I or Q data forming such parallel data, for example, assigning these data as the real number or imaginary number part, to convert the signal in the frequency region into the signal in the time region hereinafter referred to as the IDFT coefficient).

The real number part or imaginary number part of the IDFT coefficient thus obtained as explained above is converted into a serial signal on the time axis by a parallel/serial converter (P/S) 4 or 10 and is then inputted respectively to the D/A converter 6 or 12 after addition of so-called guard interval in a buffer memory 5 or 11. An output of the D/A converter 6 or 12 is supplied, in order to remove the folded element, to a low-pass filter (LPF) 7 or 13 and is then supplied to a multiplier 8 or 14 for modulation.

To the multiplier 8, the signal obtained by shifting an output of a local oscillator 15 by only 90° with a 90° phase-shifter 16 is applied and to the multiplier 14, an output of the local oscillator 15 is supplied in direct. After the output of the multipliers 8 or 14 is combined in an adder 9 and moreover only the signal of the intermediate frequency band is extracted with a band-pass filter (BPF) 17 and this is then frequency-converted in an RF converter 18 for transmission from a transmitting antenna 19 as the transmitting signal.

Next, operation will be explained. The I data and Q data are respectively converted to the parallel data from serial data in the serial/parallel converters 1 and 3 and thereafter inputted to the inverted discrete Fourier transform 2 for the IDFT process. Here, the number of pairs of the I and Q data which are IDFT-processed at a time, namely the number of symbols is called, hereunder, the one OFDM symbol.

Namely, the I and Q data in the frequency region forming one symbol is converted, by the IDFT process, into the I and Q data of the time region.

The real number part (hereinafter referred to as I signal element) and the imaginary number part (hereinafter referred to as Q signal element) of the IDFT coefficient obtained as the result of IDFT process in the inverted discrete Fourier transform 2 are respectively returned to the serial data from the parallel data respectively in the parallel/serial converters 4 and 10. Thereafter, these I and Q signal elements are respectively inputted to the buffer memories 5 and 11 and are then stored. In the buffer memories 5 and 11, the guard interval of the predetermined with is then added. This guard interval is added to alleviate influence of ghost.

The I and Q signal elements (real number part and imaginary number part of the IDFT coefficient) outputted from the buffer memories 5 and 11 are D/A converted in the D/A converters 6 and 12 and are then inputted to the multipliers 8 and 14 after the folded portions thereof are removed in the low-pass filters (LPF) 7 and 13.

In the multiplier 8, the I signal element inputted from the low-pass filter 7 is multiplied with the carrier (main carrier when the carrier modulated by the I and Q data is called the sub-carrier) outputted from the local oscillator 15 and is shifted only by 90° by the 90° phase shifter 16. Moreover, in the multiplier 14, the Q signal element outputted from the low-pass filter 13 is multiplied with the carrier (the carrier itself outputted from the local oscillator 15) which is outputted from the local oscillator 15 and is not shifted by 90° in the phase. Thereby, the I and Q signal elements are up-converted to the signals in the predetermined intermediate frequency band.

An adder 9 adds an output of the multiplier 8 and an output of the multiplier 14 and then outputs the result to a band-pass filter 17. The band-pass filter 17 extracts only the signal of the predetermined intermediate frequency band and outputs this signal to an RF converter 18. The RF converter 18 converts the frequency of the inputted intermediate frequency band signal and then outputs this signal from an antenna 19 as the electromagnetic wave.

FIG. 16 shows an example of structure of a receiver for receiving the signal transmitted from a transmitter of FIG. 15. The RF signal input is caught by a receiving antenna 31 and is then supplied to a tuner 32. The tuner 32 converts the signal of RF band into the signal of the intermediate frequency band and then supplies this signal to the multipliers 33 and 38. To the multiplier 33, the signal obtained by shifting the phase of the output of the local oscillator 47 by only 90° with the 90° phase shifter 48 is supplied, while to the multiplier 38, the output of the local oscillator 47 is supplied in direct.

The multipliers 33 and 38 respectively convert the I and Q signal elements of the intermediate frequency band into the signals of baseband frequency band, that is, to the OFDM signals. These signals are then rendered elimination of unwanted harmonics in the low-pass filters 34 and 39 and thereafter supplied to the A/D converters 35 and 40. Outputs of the A/D converters 35 and 40 are converted into the parallel data in the serial/parallel converter (S/P) 35 and 41 for the discrete Fourier transform DFT in the discrete Fourier transform (DFT) 37. An output of the discrete Fourier transform 37 is converted into the serial data on time axis in the parallel/serial converter (P/S) 42 and outputted as the I data and Q data after elimination of the guard interval in the buffer memories 43 and 45.

Here, various kinds of synchronization are required to accurately the signal transmitted from the transmitter shown in FIG. 15 with the receiver. Namely, in order to convert the OFDM signal of the intermediate frequency band (hereinafter, referred to as the OFDM modulated signal) into the OFDM signal of the baseband, the frequency and phase of the signal (regenerated carrier) outputted from the local oscillator 47 must respectively be synchronized with that in the transmitting side. Moreover, in view of demodulating the OFDM signal of the intermediate frequency band, the clock synchronized with the clock in the transmitting side must be regenerated.

Therefore, in the DAB (mode 1), one frame (96 ms) is composed, as shown in FIG. 17, of NULL for frame synchronization, TFPR as one reference symbol and 75 OFDM symbols to reproduce the regenerated carrier from the mutual correlation value of the receiving signal and reference symbol and also to reproduce the clock from the channel impulse response of the reference symbol.

However, in this method, since one reference symbol is inserted into one frame, transmission efficiency may be deteriorated. Therefore, a method to assure a longer frame period has been proposed, but since the frequency error of the regenerated carrier and clock from the transmitting side can be obtained only once when the reference symbol is used, if the frame period is set longer, the oscillator has been required to generate the stabilized oscillation frequency as the device to output (synchronously reproduce) the regenerated carrier and clock.

Therefore, it has been proposed, as the method of regenerating the regenerated carrier, that a costas loop is formed using a demodulated output of the particular frequency by paying attention only to the particular frequency (any one carrier among a plurality of carriers) of each OFDM symbol and the arithmetic result is fed back to the local oscillator 47. Moreover, as the method of regenerating the clock, it has been proposed that a costas loop is formed using demodulated output of the particular frequency by paying attention, like the clock regenerating method, only to the particular frequency other than the frequency used for carrier regeneration of each OFDM symbol and the arithmetic result is fed to the clock generator 50.

In the receiver of FIG. 16, the regenerated carrier and clock can be regenerated by forming the costas loop using demodulated output of the particular frequency explained above. That is, the carrier regenerating circuit 161 generates a control signal (phase error explained later) which is required to reproduce the carrier using the I and Q data assigned to the carrier of the particular frequency among those outputted from the buffer memories 43 and 45 in view of controlling the local oscillator 47 which outputs the regenerated carrier. In the same manner, the clock regenerating circuit 162 generates the control signal required to reproduce the clock from the I data and Q data assigned to the carrier of the particular frequency (except for those used to reproduce the regenerated carrier), thereby, to control the clock generator 50 to generate the clock.

Next, operations will be explained. The signal caught by the receiving antenna 31 is converted to the signal of the intermediate frequency band in the tuner 32 and is then supplied to the multipliers 33 and 38. The multiplier 33 multiplies the signal supplied from the tuner 32 with the signal obtained by shifting the phase of the regenerated carrier signal outputted from the local oscillator 47 by only 90° in the phase shifter 48. Thereby, the I signal element of baseband can be obtained. In the same manner, the multiplier 38 multiplies the output of tuner 32 with the output of the local oscillator 47. The Q signal element of baseband can be obtained as explained above.

The I signal element outputted from the multiplier 33 and the Q signal element outputted from the multiplier 38 are rendered elimination of unwanted harmonics by the low-pass filters 34 and 39 and are then inputted to the A/D converters 35 and 40 for the A/D conversion.

The I signal element and Q signal element A/D converted by the A/D converters 35 and 40 are respectively inputted to the serial/parallel converters 36 and 41 to conversion from the serial data to the parallel data in unit of one OFDM symbol and are then inputted to the discrete Fourier transform 37.

The discrete Fourier transform 37 executes the DFT process to the I signal element and Q signal element of the input one OFDM symbol. The I data as the real number and the Q data as the imaginary number of the value obtained by above DFT process (hereinafter referred to as the DFT coefficient) are respectively converted to the serial data from the parallel data by the parallel/serial converters 42 and 44 and are then inputted to the buffer memories 43 and 45. Here, the guard interval is removed from such data. Thereby, the data explained above are outputted as the regenerated I data and Q data.

The carrier regenerating circuit 161 detects, from the regenerated I data and Q data, the phase error of corresponding carrier and outputs the signal corresponding to the phase error to the local oscillator 47. The local oscillator 47 generates the signal of the phase and frequency corresponding to the signal supplied from the carrier regenerating circuit 161, that is, the carrier (regenerated carrier) synchronized with the carrier (main carrier) in the transmitting side. In the same manner, the clock regenerating circuit 162 controls the clock generator 50 corresponding to the phase error of the regenerated I data and Q data to synchronize the clock generated by the clock generator 50 with the clock in the transmitting side. This clock is supplied, for example, to the A/D converters 35 and 40 for use as the sampling clock.

FIG. 18 shows an example of structure of the carrier regenerating circuit 161 in the related art in such a case that the carrier of the particular frequency used for regeneration of carrier is for example QPSK modulated.

The demodulated I data and Q data are inputted to the square circuits 61 and 62 and are also inputted to the multiplier 63. The square circuits 61 and 62 squares the I data and Q data and then supplies the outputs to a subtracter 64. The subtracter 64 subtracts the two signals inputted and outputs the result to the multiplier 65. Moreover, the multiplier 63 multiplies the I data and Q data inputted to provide an output to the multiplier 65. The multiplier 65 multiplies the output of subtracter 64 and output of multiplier 63. Therefore, the result, $I^3Q-Q^3I$, is outputted from the multiplier 65.

An output of the multiplier 65 is indicated as the phase error detecting signal $\epsilon(\phi)=¼ \sin 4(\phi)$ having the characteristic shown in FIG. 20, corresponding to the carrier in the transmitting side (I axis and Q axis) and a phase error $\phi$ to the carrier in the receiving side (the phase error detecting signal $\epsilon(\phi)$ is set to a value proportional to $\sin (4\phi)$ because the similar phase error detecting signal can be obtained for the predetermined phase error using any signal point. This phase error detecting signal $\epsilon(\phi)$ is supplied to the low-pass filter (LPF) 66 to generate a control voltage of the local oscillator 47 for carrier regeneration and the control voltage is then fed back to the local oscillator 47 to regenerate the regenerated carrier.

In the same manner, according to the clock regenerating circuit 162 (formed in the same manner as the carrier regenerating circuit 161), the costas loop, etc. is formed using the other frequency than the particular frequency used for carrier regeneration and the phase error is fed back to the clock generator 50 to regenerate the clock.

When a frequency selective Rayleigh fading channel is assumed (usually, this assumption is possible) as the channel between the transmitting side and receiving side, the OFDM modulated signal emitted from the antenna 19 generates frequency distortion depending on the characteristic of channel.

Namely, if the frequency spectrum of the OFDM modulated signal emitted from the antenna 19 in the transmitting side has the rectangular shape, for example, as shown in FIG. 21A, the OFDM modulated signal received by the antenna 31 in the receiving side is reduced in the power like a wave as shown in FIG. 21B because it receives the frequency distortion by the frequency selective Rayligh fading. The carrier which has reduced the power is also lowered in C/N (carrier to noise ratio) in comparison with the carrier which does not reduce the power. Thereby, the S/N (signal to noise ratio) of the phase error voltage inputted to the local oscillator 47 (or clock generator 50) is also lowered.

Moreover, since the frequency band which lowers its power due to the frequency selective Rayleigh fading is uncertain, it is impossible to previously determine the carrier which receives frequency distortion. Deterioration of S/N of the phase error voltage due to the frequency distortion is generated in any carrier (frequency).

Therefore, in the case, for example, where the regenerated carrier or clock is regenerated using any one of the carriers indicated by the solid lines in FIG. 21, if the C/N of carrier is deteriorated, the phase error voltage having deteriorated S/N is used, resulting in a problem that it is difficult to generate the regenerated carrier or clock with higher accuracy.

OBJECT AND SUMMARY OF THE INVENTION

With the background explained above, the present invention has been proposed to regenerate, with higher accuracy, the reference signals such as regenerated carriers and clock which are required for demodulation even if frequency distortion is generated due to frequency selective Rayleigh fading.

The receiver for receiving the OFDM modulated signal of the present invention comprises a receiving means for receiving the OFDM modulated signal, a demodulating means for demodulating the received OFDM modulated signal into a baseband signal, a phase difference detecting means for outputting a phase difference information between the phase of carrier forming the demodulated OFDM signal and the phase of the carrier before one OFDM symbol, an adding means for adding the phase difference information from the phase difference detecting means as many as a plurality of carriers and a reference signal generating means for generating the reference signal used for demodulation of the OFDM modulated signal based on an output from the adding means.

A method of generating the reference signal used in the receiver for receiving the OFDM modulated signal of the present invention comprises the first step for receiving the OFDM modulated signal, the second step for demodulating the received OFDM modulated signal into the baseband signal, the third step for executing the discrete Fourier transform to the demodulated OFDM signal, the fourth step for calculating a phase error information of the phase of carrier forming the converted signal and the phase of carrier before one OFDM symbol, the fifth step for adding the phase difference information as many as a plurality of carriers and the sixth step for generating the reference signal based on the added phase difference information.

BRIEF DESCRIPTION OF THE DRAWINGS

FIG. 1 (1A–1B) is a block diagram showing an example of structure of a transmitter conforming to the DAB standards.

FIG. 3 is a diagram for showing the truth value table for explaining the differential encoding method.

FIG. 5 shows phase error which is generated in the carriers of respective frequencies because the frequency of the regenerated carrier outputted from the local oscillator 47 does not match the frequency in the transmitting side.

FIG. 6 shows phase error which is generated in the carriers of respective frequencies because the clock frequency outputted from the local oscillator 50 does not match the frequency in the transmitting side.

FIG. 11 (11A–11B) is a block diagram showing a structure of the second embodiment of the receiver to which the present invention is applied.

FIG. 12 (12A–12B) is a block diagram showing an example of the structure of the carrier regenerating circuit 131 of FIG. 11.

DESCRIPTION OF THE PREFERRED EMBODIMENTS

Figure 15A:
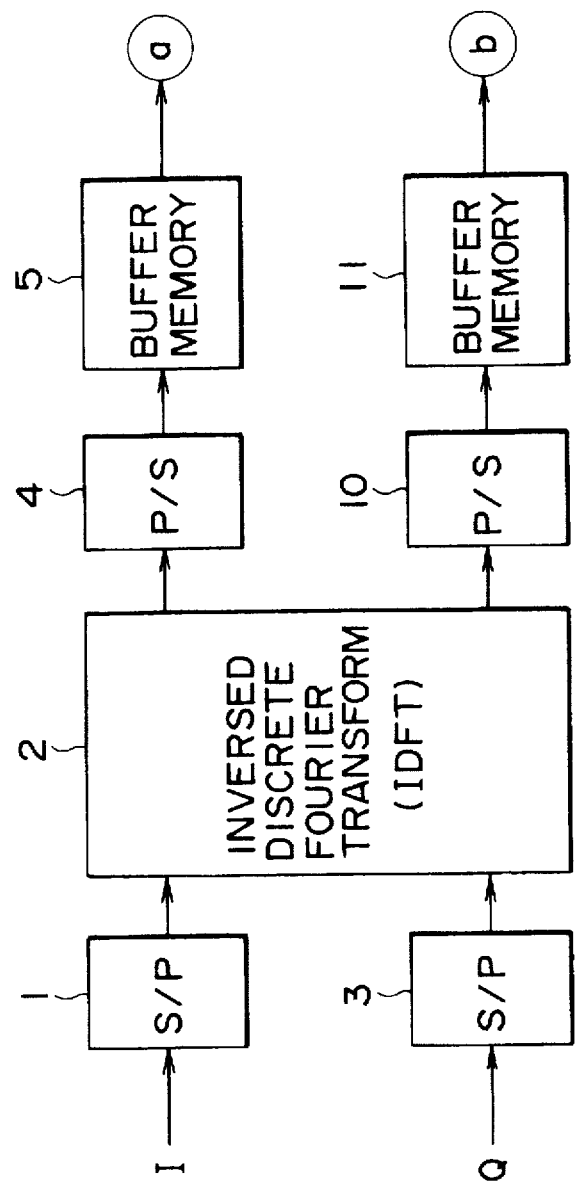
FIG. 15 (15A–15B) is a block diagram showing an example of the structure of the receiver of the related art.

The receiver to which the present invention is applied will be explained. FIG. 1 shows an example of structure of the transmitter conforming, for example, to the DAB standards. Namely, in this transmitter, each carrier is transmitted through the differential QPSK modulation. In FIG. 1, the elements like those in FIG. 15 are designated by the like reference numerals and these elements are not explained repeatedly.

A delay circuit 81 or 82 is designed to provide an output to a differential encoding circuit 83 by respectively delaying the input I or Q data as much as one OFDM symbol. The differential encoding circuit 83 uses an output of the delay circuit 81 or 82 for differential encoding of the input I or Q data.

In the transmitter constituted as explained above, the I data (in-phase input signal) and the Q data (quadrature input signal) forming one symbol are inputted to the differential encoding circuit 83 and only I or Q data is respectively inputted to the delay circuit 81 or 82. In this embodiment, since the carrier is QPSK modulated (differential QPSK modulation) as explained above, the I or Q data forming one symbol is respectively formed of one bit and therefore these two bits form one symbol.

Figure 2:
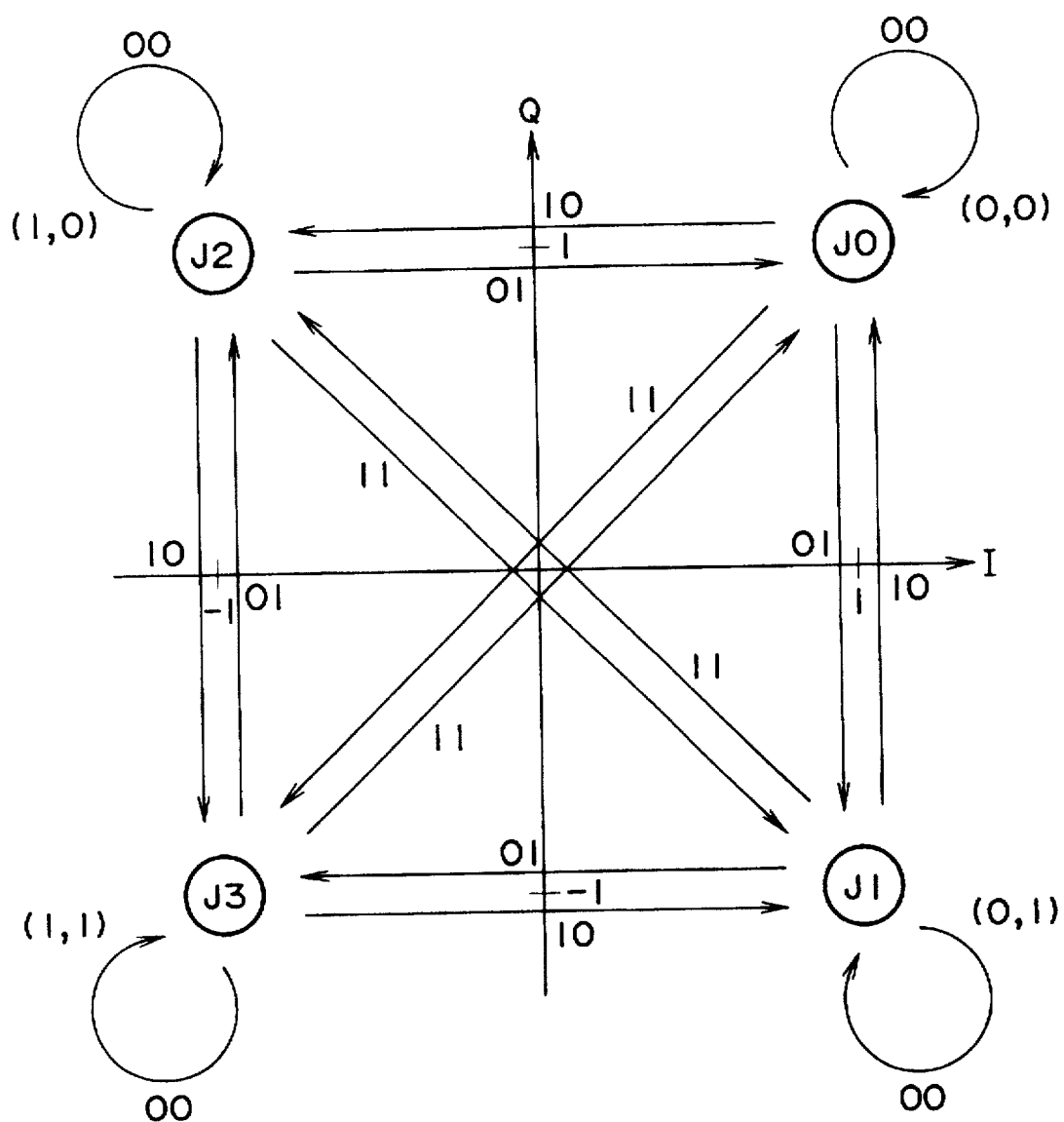
FIG. 2 is a diagram for explaining the differential encoding method.

In the delay circuit 81 or 82, I or Q data is delayed respectively as much as one OFDM symbol and is then supplied to the differential encoding circuit 83. Namely, when the OFDM modulated signal is formed of N carriers (therefore, when IDFT (Inverted Discrete Fourier Transform) is carried out at the N points in the IDFT 2 in the subsequent stage), the I or Q data which is respectively delayed as much as N symbols is supplied to the differential encoding circuit 83 from the delay circuit 81 or 82. (one OFDM symbol=N symbols) In the differential encoding circuit 83, the I and Q data are differentially encoded using outputs of the delay circuits 81 and 82 (total adding process of the Gray Code) and the differential I and Q data obtained as a result are outputted. That is, a symbol of a pair of I and Q data is expressed as (I, Q) and it is assumed that the points J0, J1, J2 and J3 on the phase plane are assigned to the signal points for each symbol (0, 0), (0, 1), (1, 0), (1, 1), for example, as shown in FIG. 2.

In this case, when the signal point before one OFDM symbol is indicated by J0 (0, 0), if the signal points J0, J1, J3, J2 located at the position where above signal point is rotated clockwise by 0, π/2, π, or 3π/2 is inputted, the differential encoding circuit 83 outputs the pairs of differential I and Q data of the signal points of J0 (0,0), J1 (0,1), J3 (1,1) and J2 (1,0). Moreover, when the signal point before one OFDM symbol is indicated by J1 (0,1), if the signal points J1, J2, J2, J0 located at the positions rotated clockwise by 0, π/2, π, or 3π/2 from the signal point are inputted (01, 11, 10, 11 on the arrow mark), the differential encoding circuit 83 outputs the pairs of differential I and Q data of the signal points of J3 (1,1), J2 (1,0), J0 (0,0), J1 (0,1).

In the same manner, when the signal point is indicated by J3 (1,1) before one OFDM symbol, if the signal points J3, J2, J0 or J1 located at the positions rotated clockwise by 0, π/2, π, or 3π/2 from the above signal point are inputted (11, 10, 00, 01 on the arrow mark), the differential encoding circuit 83 outputs pairs of differential I and Q data of the signal points J0 (0,0), J1 (0,1), J3 (1,1) and J2 (1,0). Moreover, when the signal point before one OFDM symbol is indicated by J2 (1,0), if the signal points J2, J0, J1 or J3 located at the positions rotated clockwise by 0, π/2, π, or 3π/2 from the above signal point are inputted (10, 00, 01, 11 on the arrow mark), the differential encoding circuit 83 outputs pair of differential I and Q data of the signal points J3 (1,1), J2(1,0), J0 (0,0), J1 (0,1).

Therefore, the differential encoding circuit 83 outputs, when the input symbol is (0,0), the differential I and Q data of the signal point before one OFDM symbol. Moreover, when the input symbol is (0,1), the differential I and Q data of the signal point rotated clockwise by π/2 from the signal point before one OFDM symbol are outputted. Moreover, when the input symbol is (1,1), the differential I and Q data of the signal point rotated clockwise by π from the signal point before one OFDM symbol are outputted. When the input symbol is (1,0), the differential I and Q data of the signal point rotated clockwise by 3π/2 from the signal point before one OFDM symbol are outputted.

Here, the truth value table (truth value table for total addition of the Gray codes) of the value outputted by the differential encoding circuit 83 corresponding to the input signal point (current information point) and signal point (preceding information point) before one OFDM symbol is shown in FIG. 3.

The differential I or Q data is inputted to the serial/parallel converter 1 or 3, then converted to the parallel data of one OFDM symbol unit (the bits in the same number as one OFDM symbol), converted to the OFDM modulated signal as explained above and is then emitted from the antenna 19.

Figure 4A:
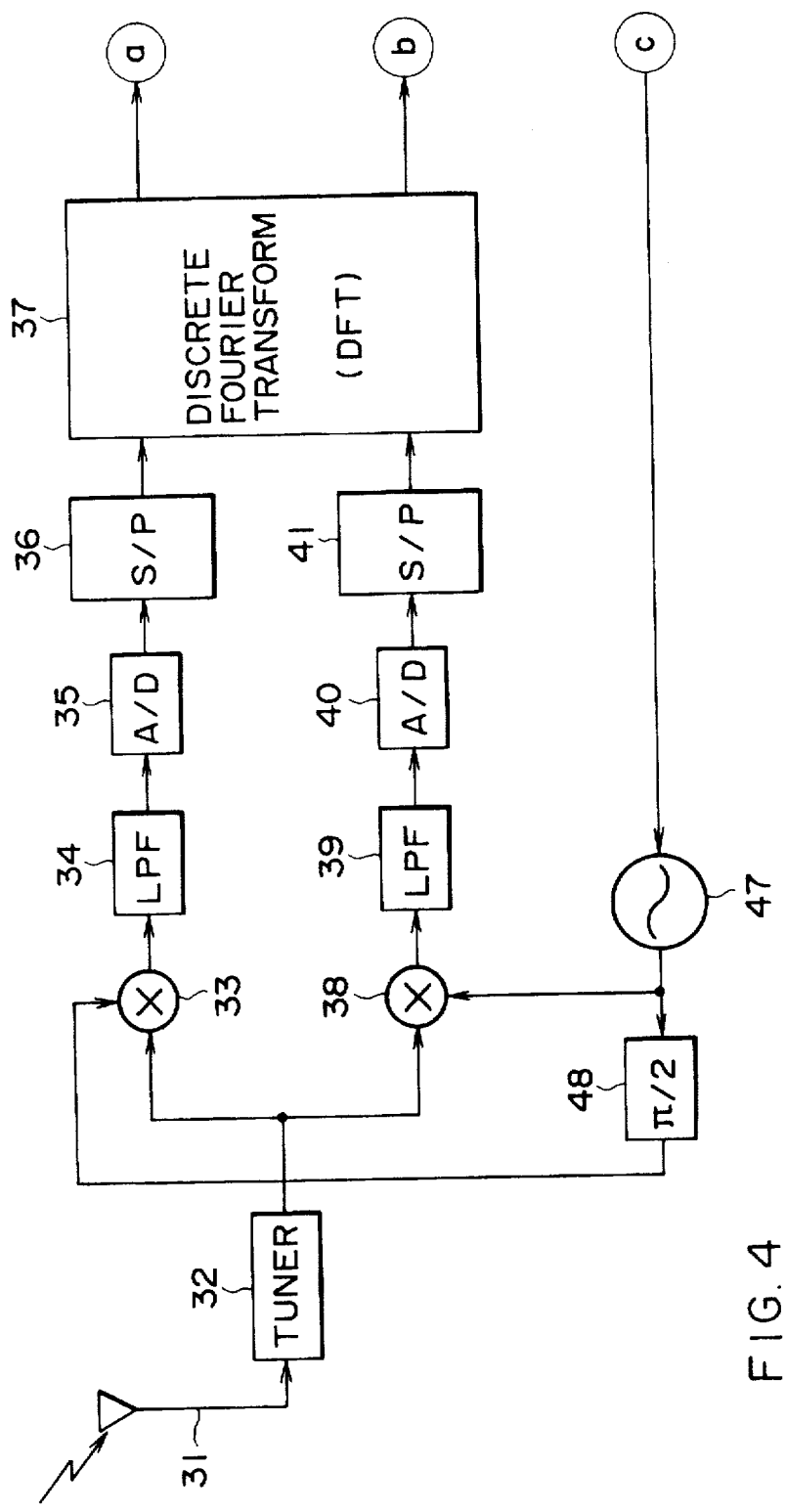
FIG. 4 (4A–4B) is a block diagram showing a structure of the first embodiment of the receiver to which the present invention is applied.
Figure 4:
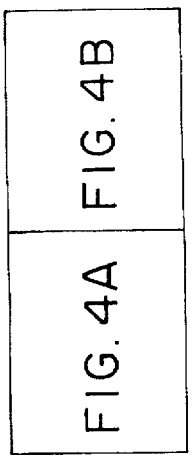

Next, FIG. 4 shows an example of the structure of the receiver for receiving the OFDM modulated signal transmitted as explained above. The elements like those in FIG. 16 are designated by the like reference numerals and the repeated explanation is omitted here.

Figure 16A:
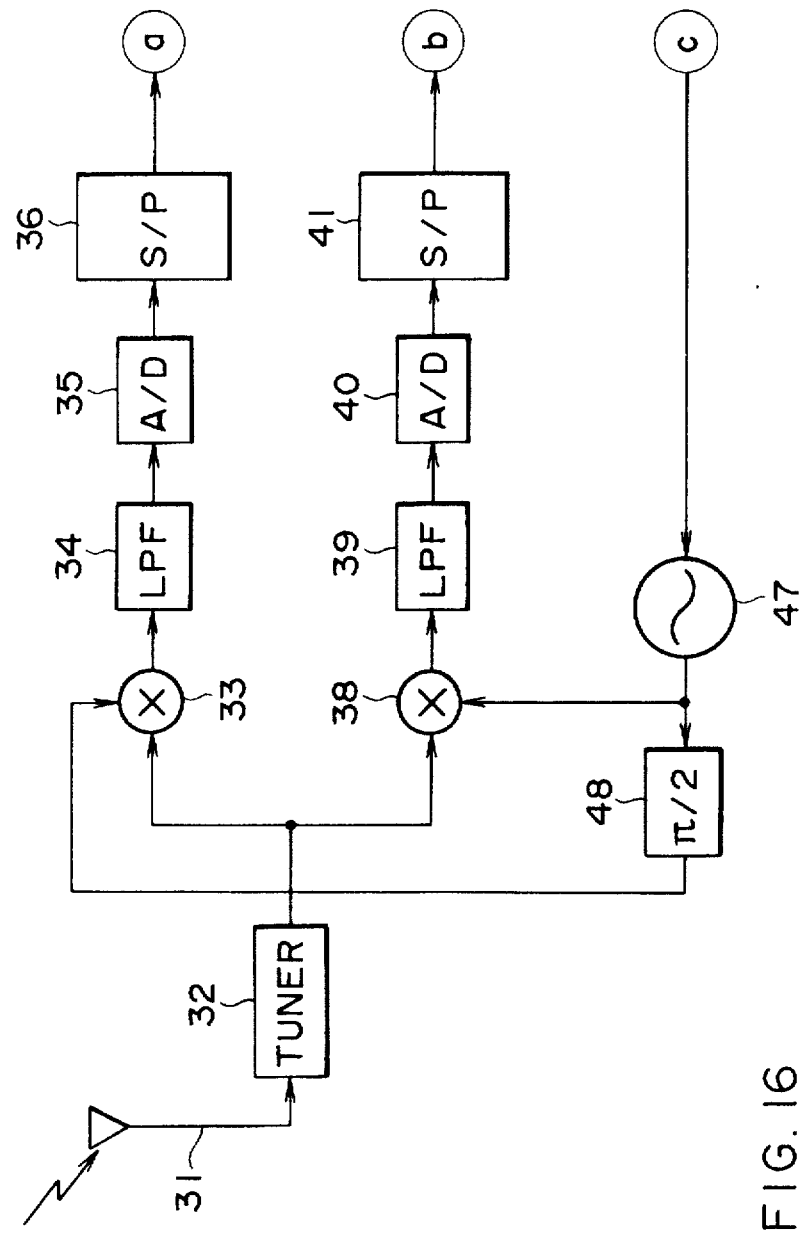
FIG. 16 (16A–16B) is a block diagram showing an example of the structure of the receiver of the related art.
Figure 16:
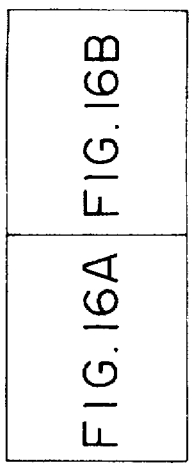
Figure 17:
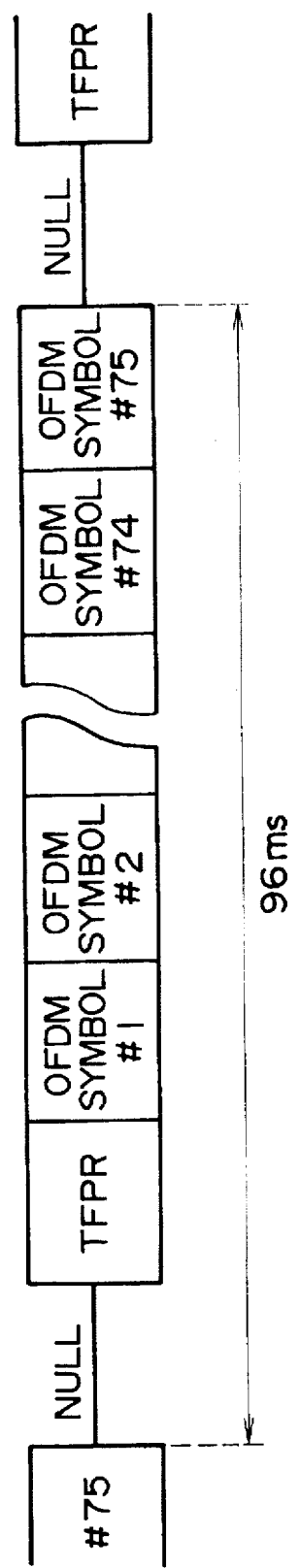
FIG. 17 is a diagram showing a format of the frame employed in DAB.

The OFDM modulated signal is received by an antenna 31 and is processed in the same manner as shown in FIG. 16. Thereby, the buffer memory 43 or 45 outputs the differential I or Q data, respectively. The delay circuit 91 or 92, like the delay circuit 81 or 82 of FIG. 1, delays the differential I or Q data outputted from the buffer memory 43 or 45 as much as one OFDM symbol to provide the output to the differential decoding circuit 93. The differential decoding circuit 93 differentially decodes the input differential I or Q data using the delay circuit 91 or 92 and thereby outputs the I or Q data.

The carrier regenerating circuit 46 generates a control signal to control the regenerated carrier using all I and Q data of one OFDM symbol outputted from the differential decoding circuit 93 and controls the local oscillator 47 on the basis of this control signal. The clock regenerating circuit 49 also generates, like the carrier regenerating circuit 46, the control signal using all I data and Q data of one OFDM symbol from the differential decoding circuit 93 and thereby controls the clock generator 50.

In the receiver structured as explained above, the differential I and Q data outputted from the buffer memory 43 or 45 is supplied to the delay circuit 91 or 92. Moreover, this differential I and Q data are also supplied to the differential decoding circuit 93. In the delay circuit 91 or 92, the differential I or Q data is delayed as much as one OFDM symbol and is then outputted to the differential decoding circuit 93.

The differential decoding circuit 93 uses an output of the delay circuit 91 or 92 to differentially decode the differential I or Q data supplied from the buffer memory 43 or 45. Namely, when the phase of the signal point corresponding to the symbol (here, symbol formed of the differential I and Q data) assigned to the nth carrier in the decoded kth OFDM symbol #k is defined as $\theta_{k,n}$, the differential decoding circuit 93 outputs the symbol corresponding to the signal point where the phase $\psi_{k,n}$ is expressed by the following equation.

$$\psi_{k,n} = \theta_{k,n} - \theta_{k-1,n} + \pi/4$$

Where, k=1, 2, ... ; n=0, 1, ..., N−1; N, number of symbols forming one OFDM symbol, namely, number of carriers.

Therefore, the differential decoding circuit 93 outputs symbol (0,0), (0,1), (1,1) or (1,0) when the a phase difference in the direction of clockwise rotation between the signal point expressed by the pair of differential I or Q data before one OFDM symbol from the delay circuit 91 or 92 and the signal point expressed by the pair of current differential I and Q data is 0, π/2, π, or 3π/2. Therefore, the differential decoding circuit 93 can be said to calculate a phase difference between the phase of carrier forming the OFDM signal and the phase before one OFDM symbol of such carrier and output the symbol corresponding to such phase difference.

The carrier regenerating circuit 46 obtains, for example, all phase errors of the carriers assigned to the I and Q data as much as one OFDM symbol outputted from the differential decoding circuit 93 and synchronizes the frequency and phase of the regenerated carrier outputted from the local oscillator 47 to those in the transmitting side. In the same manner, the clock regenerating circuit 49 controls the clock generator 50, using, for example, all phase errors of carriers assigned to the I data and Q data as much as one OFDM symbol from the differential decoding circuit 93.

As explained above, since the local oscillator 47 and block generator 50 are controlled using all phase errors of carriers, if the power of carrier in the predetermined frequency band is lowered due to the frequency selective Rayleigh fading, S/N of the phase error voltage is not so much deteriorated (in comparison with the case using only one carrier). Therefore, if frequency distortion is generated in any carrier by the frequency selective Rayleigh fading, the regenerated carrier and clock can be regenerated with higher accuracy.

Next, the principle of the processings executed by the carrier regenerating circuit 46 and clock regenerating circuit 49 will be explained. First, when the regenerated carrier outputted from the local oscillator 47 is not matched with the carrier in the transmitting side (carrier outputted from the oscillator 15 of FIG. 1) (however, the clock is assumed to be matched in the transmitting and receiving side), the phase error of the carrier assigned to the symbol obtained by differential decoding becomes constant without relation to the frequency. Namely, when the total number of carriers forming the OFDM signal is assumed, for example, as 2048 (therefore, one OFDM symbol is formed of 2048 symbols and IDFT or DFT is carried out at 2048 points in the IDFT 2 or DFT 37), the phase error $E_c(n)$ of the nth carrier generated because the regenerated carrier does not match the carrier in the transmitting side is indicated by an even function as shown in FIG. 5.

However, in FIG. 5 (similar to FIG. 6 and FIG. 7 described later), n is assumed to take the values—1024, 1023, ..., −1, 1, 2, ..., 1023, 1024 in place of 0, 1, ..., 2074, with reference to the center point (so-called, the point corresponding to 1024.5) among 2048 points. Therefore, in this case, the carriers (corresponding to n=0, 1, ..., 1023 when considering in the range of n=0, 1, ..., 2047) corresponding to n = −1024, 1023, ..., −1 are considered to have the negative frequency, while the carriers (corresponding to n=1024, 1025, ..., 2047 when considering in the range of n=0, 1, ..., 2047) corresponding to n=1, 2, 1024 is considered to have the positive frequency.

Moreover, when the clock outputted from the clock generator 50 is not matched with that in the transmitting side (however, the carrier (main carrier) is matched with in the transmitting and receiving sides), the phase error of the carrier assigned to the symbol obtained by the differential decoding increases in proportion to the frequency. Namely, when the total number of carriers forming the OFDM signal is assumed, for example, to be 2048 as in the case explained above, the phase error $E_s(n)$ of the nth carrier due to mismatching of clock with that in the transmitting side is indicated by an odd function as shown in FIG. 6.

Figure 7:
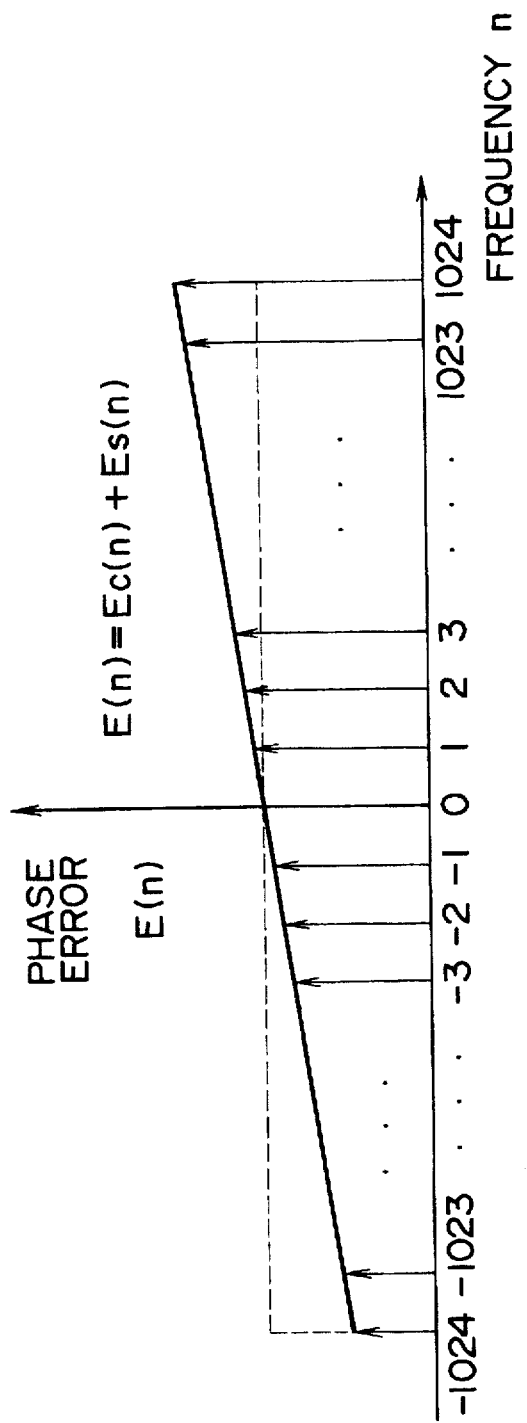
FIG. 7 shows phase error which is generated in the carriers of respective frequencies because the frequency of regenerated carrier outputted from the local oscillator 47 does not match the frequency in the transmitting side and the frequency of clock outputted from the local oscillator 50 does not match the frequency in the transmitting side.

Moreover, when both regenerated carrier and clock are not matched with that in the transmitting side, the phase error E(n) of the nth carrier is expressed as a linear sum of the phase error $E_c(n)$ and $E_s(n)$ mentioned above. That is, when the total number of carriers forming the OFDM signal is set to 2048 as in the case mentioned above, the phase error $E_c(n)$ is expressed as shown in FIG. 7.

As explained above, since the phase error $E_c(n)$ or $E_s(n)$ is expressed by an even function or an odd function, a value corresponding to the phase error generated by mismatching of the regenerated carrier can be obtained by adding the phase error E(n) and E(−n) and a value corresponding to the phase error generated by mismatching of the clock can also be obtained by obtaining subtraction of the phase error E(n) and E(−n).

In the carrier regenerating circuit 46 or clock regenerating circuit 49, phase error due to mismatching of carrier or phase error due to mismatching of clock is detected based on such principle and it is then fed back to the local oscillator 47 or clock generator 50 to respectively regenerate the regenerated carrier or clock.

Figure 8:
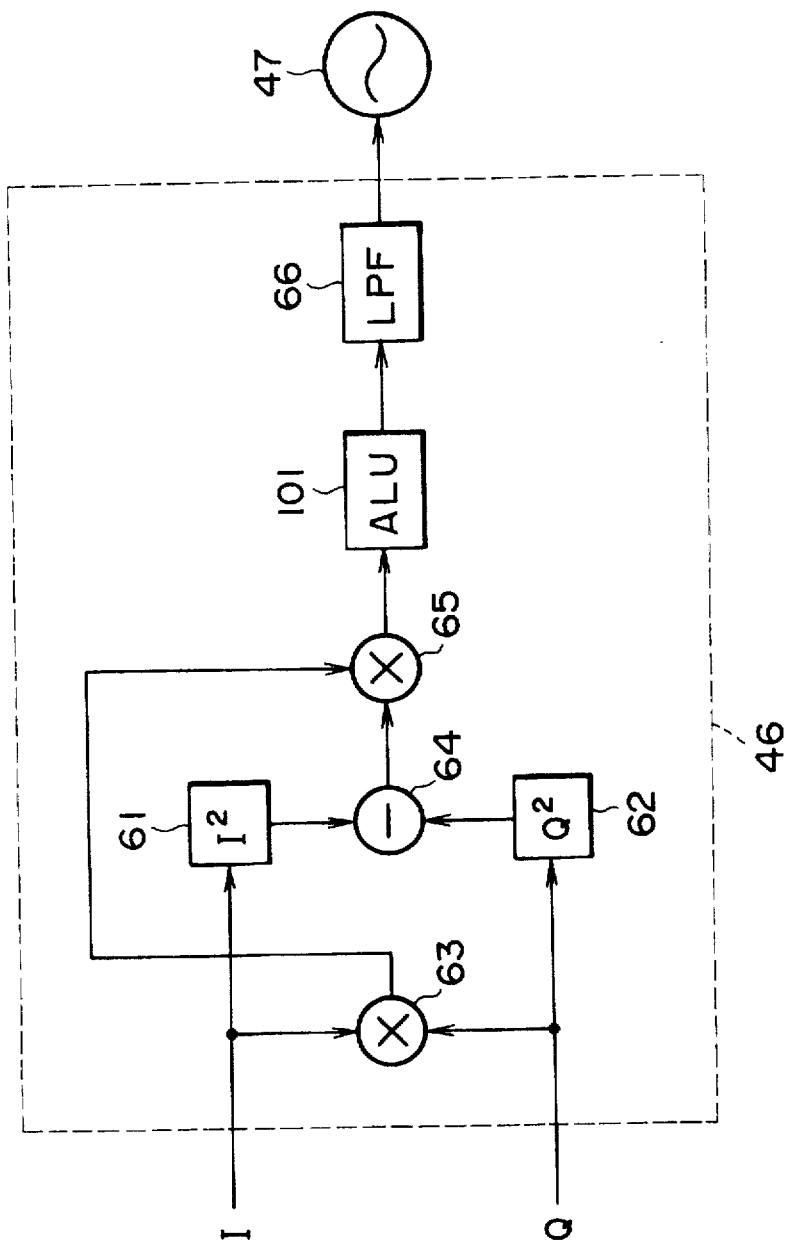
FIG. 8 is a block diagram showing an example of the structure of the carrier regenerating circuit 46 of FIG. 4.
Figure 18:
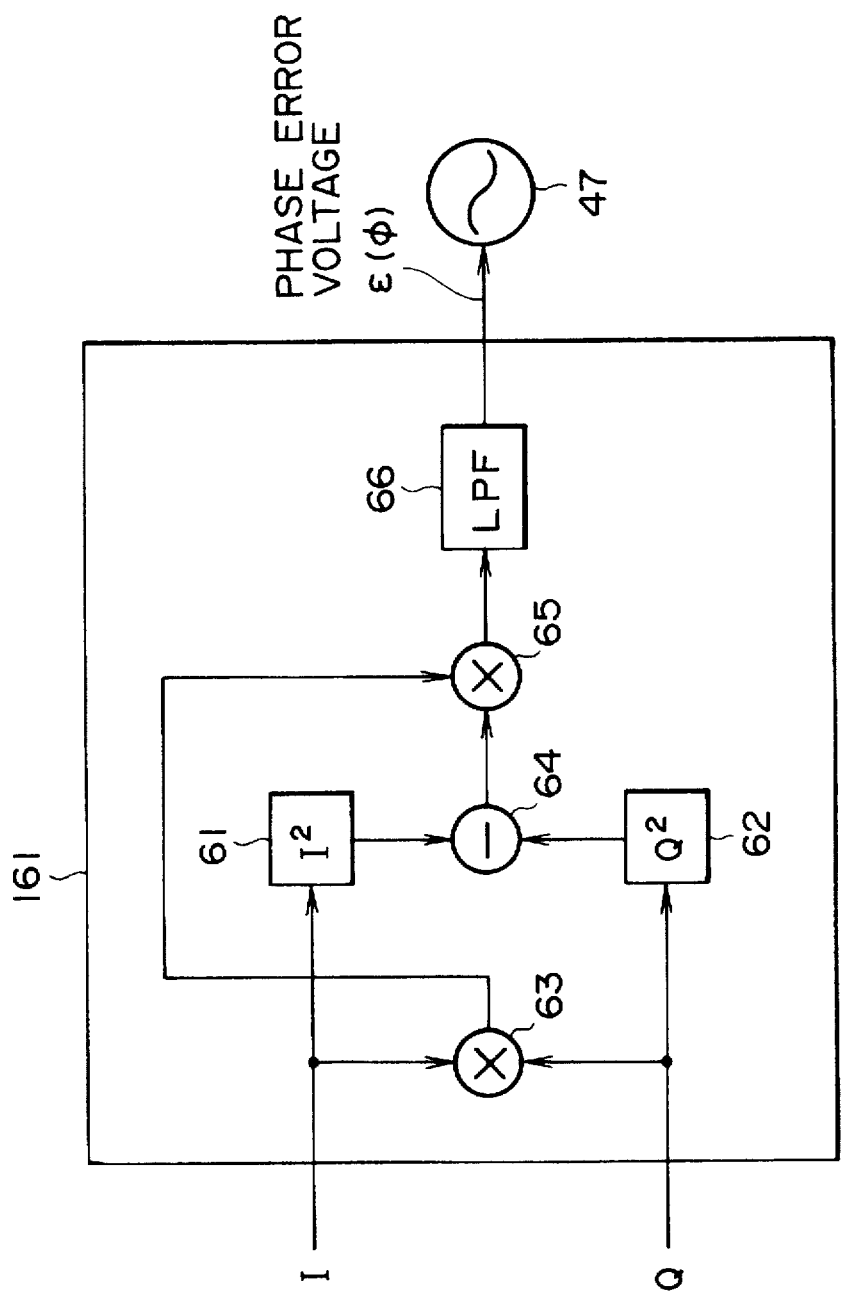
FIG. 18 is a block diagram showing an example of the structure of the carrier regenerating circuit 161 of FIG. 16.
Figure 19:
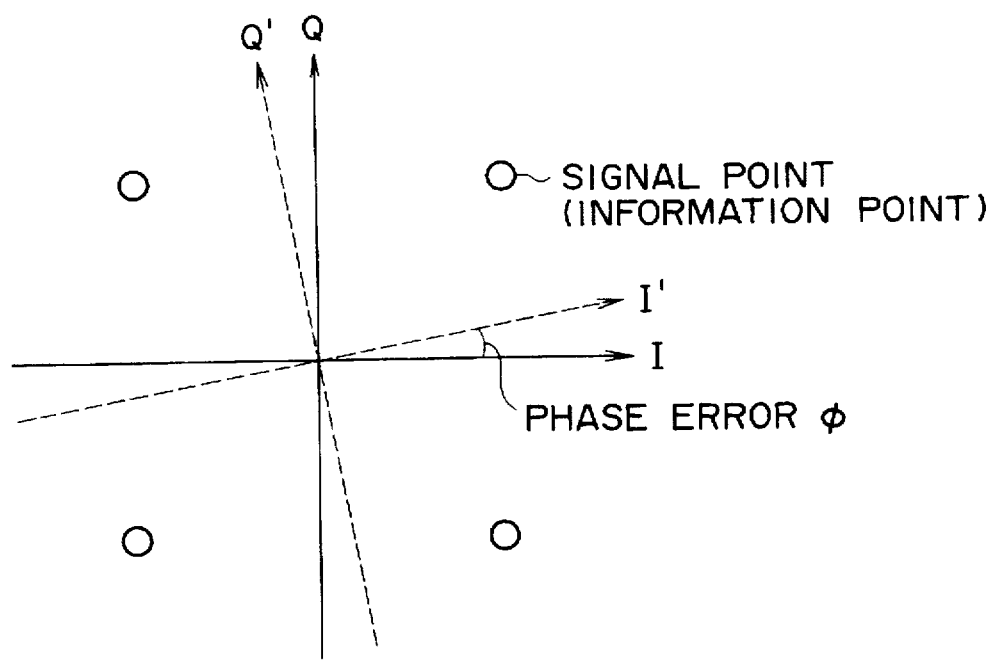
FIG. 19 is a diagram for explaining phase error detected by the carrier regenerating circuit 161 of FIG. 18.
Figure 20:
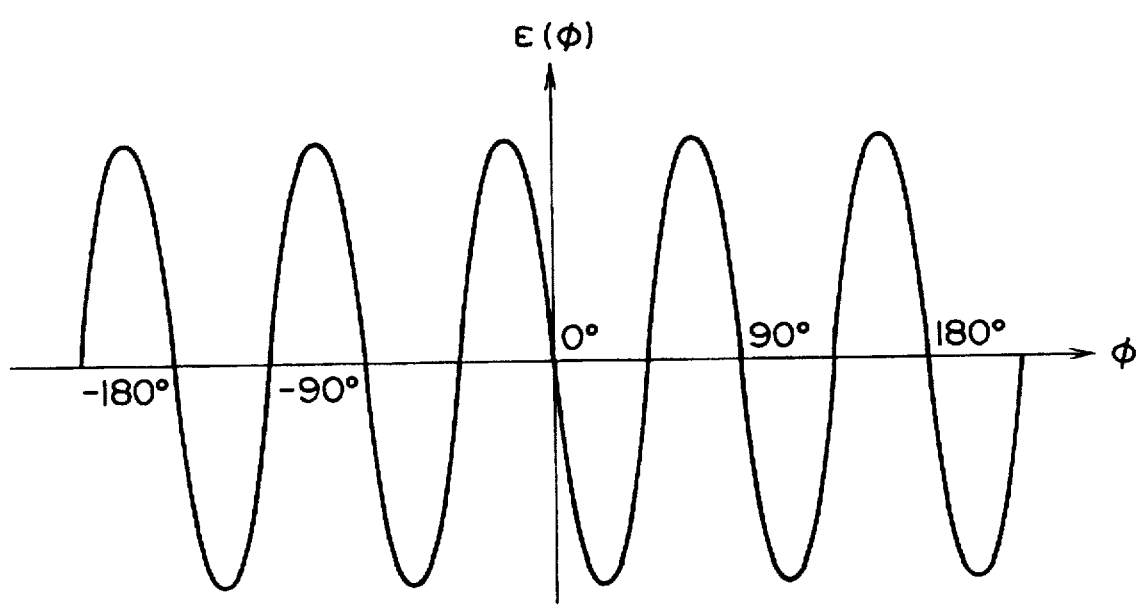
FIG. 20 shows a waveform indicating phase error detecting signal outputted from the arithmetic unit 65 of FIG. 18.
Figure 21A:
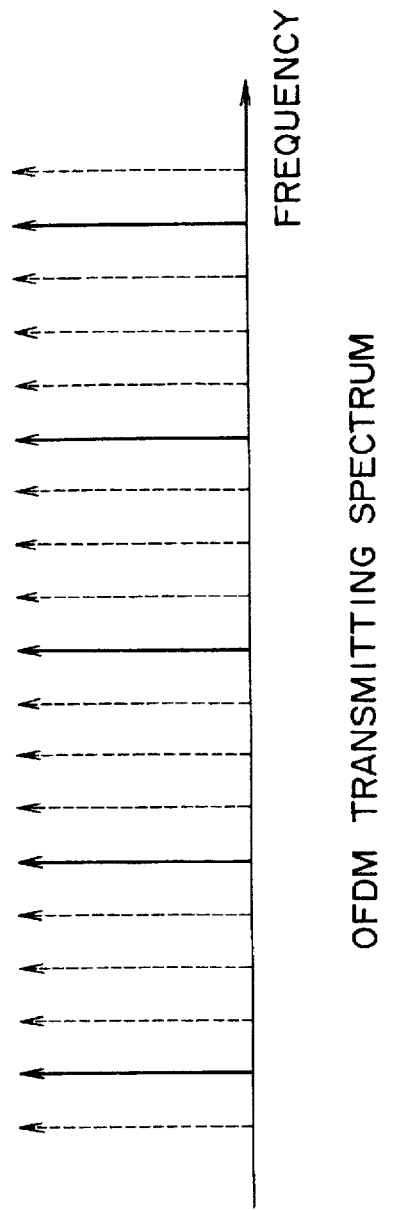
FIG. 21 (21A–21B) is a diagram for explaining the frequency selective Rayleigh fading.
Figure 21B:
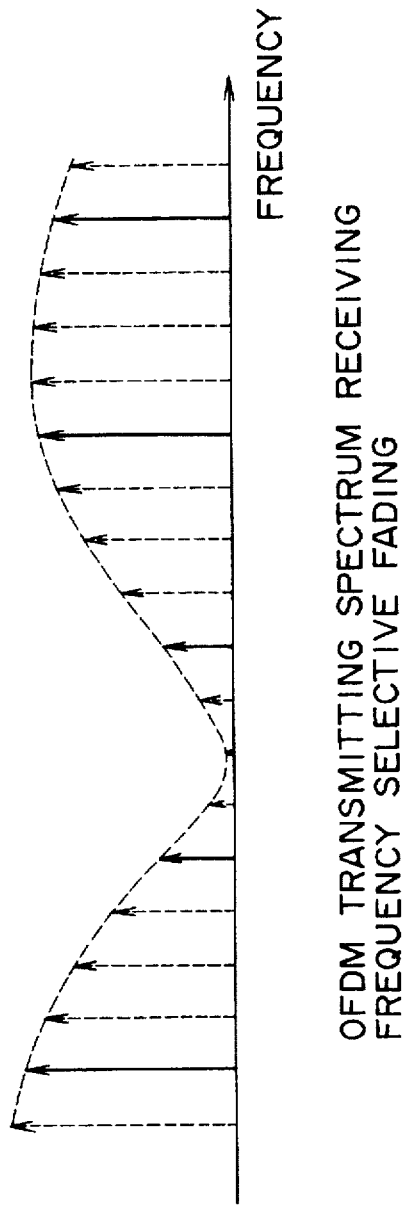

That is, FIG. 8 shows an example of the structure of the carrier regenerating circuit 46. In this figure, the elements like those in the carrier regenerating circuit 161 of FIG. 18 are designated by the like reference numerals and the repeated explanation is omitted here. Namely, this carrier regenerating circuit 46 is formed similar to the carrier regenerating circuit 161 of FIG. 18, except for that ALU 101 is newly provided between the multiplier 65 and LPF 66.

To the ALU 101, an output of the multiplier 65 is supplied. As explained previously, the multiplier 65 is caused to output the phase error detecting signal corresponding to phase error. Therefore, the phase error detecting signal of each carrier forming the OFDM signal is supplied ALU 101. ALU 101 calculates the total sum of the phase error detecting signals outputted from the multiplier 65 and then outputs the result of calculation to LPF 66. ALU 101 is reset, for example, in unit of one OFDM symbol and thereby the total sum of the phase error detecting signals of each carrier forming one OFDM symbol is outputted from ALU 101.

In the carrier regenerating circuit 46 structured as explained previously, the total sum of the phase error detecting signals outputted from the multiplier 65 is calculated in unit of one OFDM symbol in the ALU 101. This total sum eliminates noise element through the LPF 66 and is then fed back 47 to the local oscillator 47.

Since the total sum of the phase error difference detecting signal of all carriers forming one OFDM symbols becomes equal to the value, as explained above, corresponding to the phase error only due to mismatching of the carriers, the carrier can be regenerated in the phase matching with that in the transmitting side by feeding back the above total value to the local oscillator 47.

Figure 9:
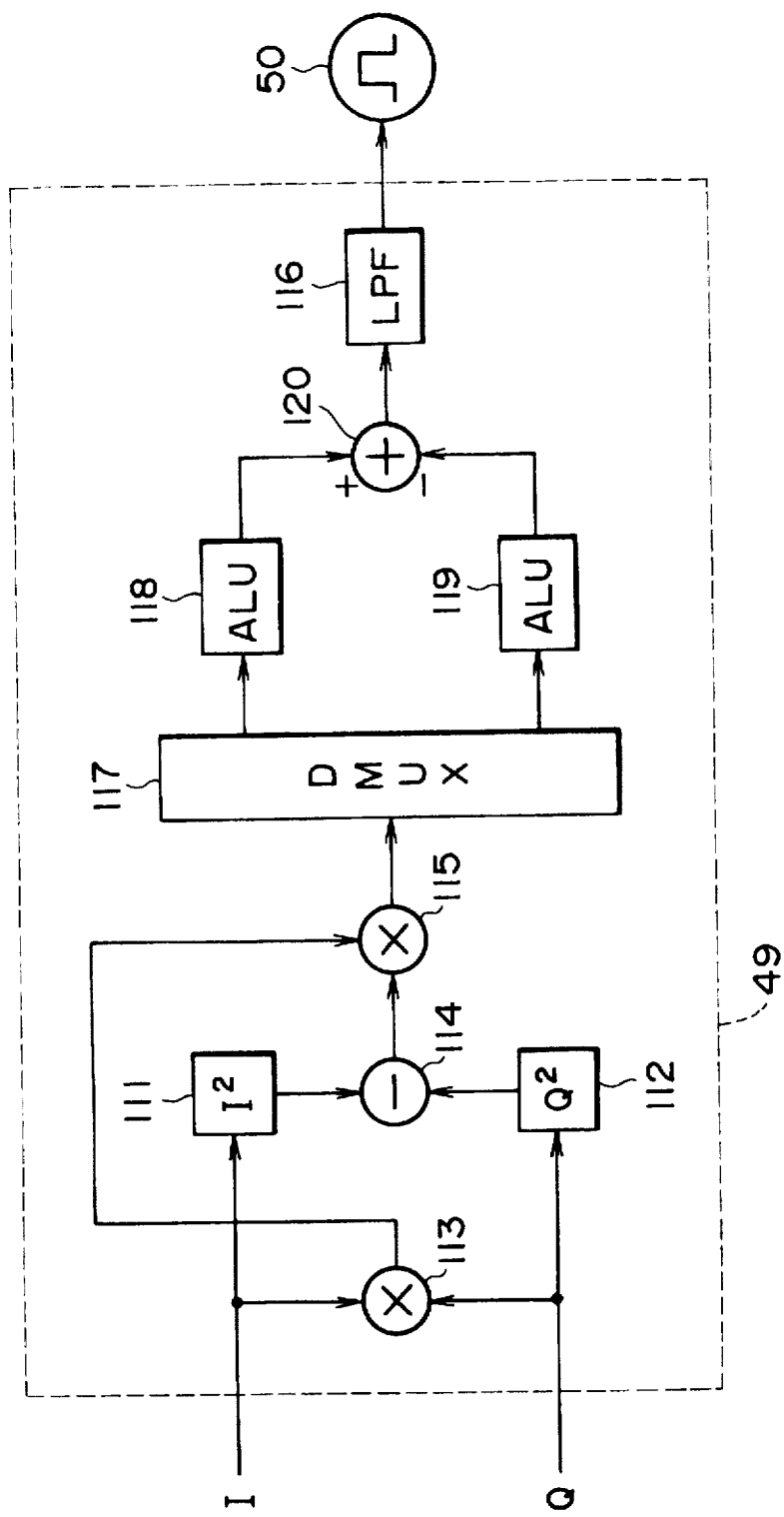
FIG. 9 is a block diagram showing an example of the structure of the clock regenerating circuit 49 of FIG. 4.

Next, FIG. 9 shows an example of the structure of the clock regenerating circuit 49. The square circuits 111, 112, multiplier 113, subtracter 114, multiplier 115 or LPF 116 are respectively formed in the same manner as the square circuits 61, 62, multiplier 63, subtracter 64, multiplier 65 or LPF 66. Therefore, like the multiplier 65, the phase error detecting signal corresponding to phase error of carrier is outputted from the multiplier 115.

DMUX 117 selects, among the phase error detecting signals outputted from the multiplier 65, the phase error detecting signal of the carrier of positive frequency (phase error detecting signal of the carrier of positive n corresponding to the frequency of carrier explained in regard to FIG. 5 to FIG. 7) and the phase error detecting signal of the carrier of negative frequency (phase error detecting signal of the carrier of negative n corresponding to the frequency of carrier explained in regard to FIG. 5 to FIG. 7) and respectively outputs the phase error detecting signal of the carrier of positive frequency to ALU 118, while the phase error detecting signal of the carrier of negative frequency to ALU 119.

ALU 118 calculates the total sum of the phase error detecting signals supplied from DMUX 117 and outputs the result to the subtracter 120. ALU 118 is reset, for example, in unit of one OFDM symbol. Therefore, ALU 118 outputs the total sum of the phase error detecting signals of all positive carriers forming one OFDM symbol.

Like ALU 118, ALU 119 also calculates the total sum of the phase error detecting signals supplied from DMUX 117 and outputs the result to the subtracter 120. Therefore, ALU 119 outputs the total sum of the phase error detecting signals of all negative carriers forming one OFDM symbol.

The subtracter 120 obtains a difference between output of ALU 118 and output of ALU 119. Therefore, the subtracter 120 outputs a difference between the total sum of the phase error detecting signals of all positive carriers forming one OFDM symbol and the total sum of the phase error detecting signals of all negative carriers forming one OFDM symbol.

In the clock regenerating circuit 49 formed as explained above, the phase error detecting signal of carriers of positive frequency or the phase error detecting signal of carriers of negative frequency among the phase error detecting signals outputted from the multiplier 115 is selected in DMUX 117 and it is then outputted to ALU 118 or 119, respectively. In ALU 118 or 119, the total sums of the phase error detecting signals of carriers of positive frequency outputted from DMUX 117 or the phase error detecting signals of carriers of negative frequency are calculated in unit of one OFDM symbol and are then outputted to the subtracter 120. In the subtracter 120, a difference between the total sum of the phase error detecting signals of positive carriers from ALU 118 and the total sum of the phase error detecting signals of negative carriers from ALU 119. This difference value is rendered elimination of noise element and is then fed back to the clock generator 50 through LPF 116.

As explained above, a difference between the total value of the phase error detecting signals of all carriers of positive frequency forming one OFDM symbol and the total value of the phase error detecting signals of all carriers of negative frequency forming one OFDM symbol corresponds to the phase error generated only by mismatching of the clocks. Therefore, the clock matched with that in the transmitting side can be regenerated by feeding back the difference value obtained above to the clock generator 50.

The square circuits 61, 62, multiplier 63, subtracter 64 or multiplier 65 in the carrier regenerating circuit 46 of FIG. 8 are formed in the same manner as the square circuits 111, 112, multiplier 113, subtracter 114 or multiplier 115 in the clock regenerating circuit 49 of FIG. 9. Therefore, the carrier regenerating circuit 46 and clock regenerating circuit 49 can be formed as the integrated circuit using this part in common.

Figure 10:
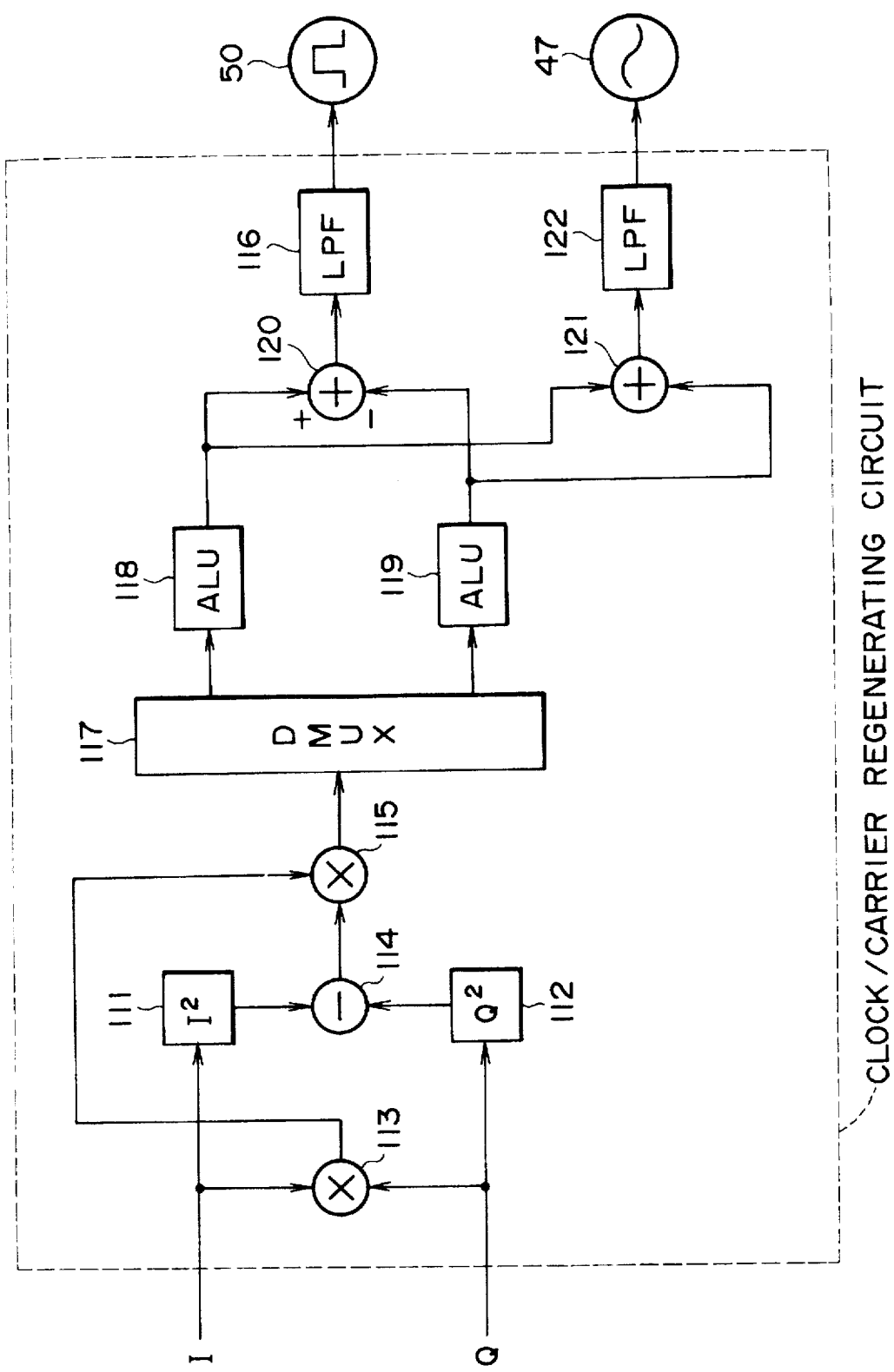
FIG. 10 is a block diagram showing an example of the structure of a clock/carrier regenerating circuit integrating the carrier regenerating circuit of FIG. 8 and the clock regenerating circuit of FIG. 9.

Therefore, FIG. 10 shows an example of the structure of the clock/carrier regenerating circuit integrating the carrier regenerating circuit 46 and the clock regenerating circuit 49. In FIG. 10, the elements corresponding to those of the clock regenerating circuit 49 in FIG. 9 are designated by the like reference numerals. Namely, this clock/carrier regenerating circuit may be formed in the same manner as the clock regenerating circuit 49 of FIG. 9, except for the adder 121 and LPF 122 which are newly added.

An output of ALU 118 and an output of ALU 119 are supplied to the adder 121. The adder 121 adds an output of ALU 118 and an output of ALU 119 to provide an output to LPF 122. LPF 112 is formed in the same structure as LPF 66 of FIG. 8 to filter an output of the adder 121 and to feed back the filtered signal to the local oscillator 47.

In the clock/carrier regenerating circuit formed as explained above, a value corresponding to the phase error only due to mismatching of the clock is fed back to the clock generator 50 as explained in regard to FIG. 9.

On the other hand, in the adder 121, the total sum of the phase error detecting signals of positive carriers from ALU 118 is added to the total sum of the phase error detecting signals of negative carriers from ALU 119. Therefore, the total sum of the phase error detecting signals of each carrier forming one OFDM symbol can be obtained and is then fed back to the local oscillator 47 via LPF 122.

Accordingly, the clock and carrier matching with those in the transmitting side can be regenerated using this clock/carrier regenerating circuit in place of the carrier regenerating circuit 46 and clock regenerating circuit 49. Moreover, in this case, the receiver can be formed small in size at a low cost.

The principle explained in regard to FIG. 5 to FIG. 7 can also be applied, like the transmitter shown in FIG. 1, to the case where not only the symbol is differentially encoded in the transmitting side but also the symbol is not differentially encoded. That is, the principle explained in regard to FIG. 5 to FIG. 7 can be established when the symbol is differentially decoded in the receiving side without relation to the processings in the transmitting side.

Therefore, FIG. 11 shows an example of the structure of the receiver for receiving the signal from the transmitter (for example, the transmitter shown in FIG. 15) which transmits the symbol as the OFDM signal without differential encoding. In FIG. 11, the elements like those in FIG. 16 are designated with the like reference numerals and the repeated explanation will be omitted here.

This receiver is formed in the same manner as the receiver of FIG. 16, except for that the carrier regenerating circuit 131 or clock regenerating circuit 132 is provided in place of the carrier regenerating circuit 161 or clock regenerating circuit 162.

FIG. 12 shows an example of the structure of the carrier regenerating circuit 131. In FIG. 12, the elements corresponding to those in the carrier regenerating circuit 46 of FIG. 8 are designated with the like reference numerals. Namely, the carrier regenerating circuit 131 is formed in the same manner as the carrier regenerating circuit 46 of FIG. 8, except for that the delay circuits 14 and 142, differential decoding circuit 143 are newly provided.

The delay circuits 141, 142 or differential decoding circuit, 143 are also formed in the same manner as the delay circuits 91, 92 or differential decoding circuit 93 in FIG. 4.

Accordingly, in the carrier regenerating circuit 131, the differential decoding circuit 143 differentially decodes the I and Q data. Thereby, the differentially decoded I data is supplied to the square circuit 61 and multiplier 63, while the differentially decoded Q data is supplied to the square circuit 62 and multiplier 63.

In the same manner as the case of FIG. 8, the total sum of the phase error detecting signals of all carriers forming one OFDM symbol is fed back to the local oscillator 47 and thereby the carrier matching with that in the transmitting side can be regenerated.

Figure 13A:
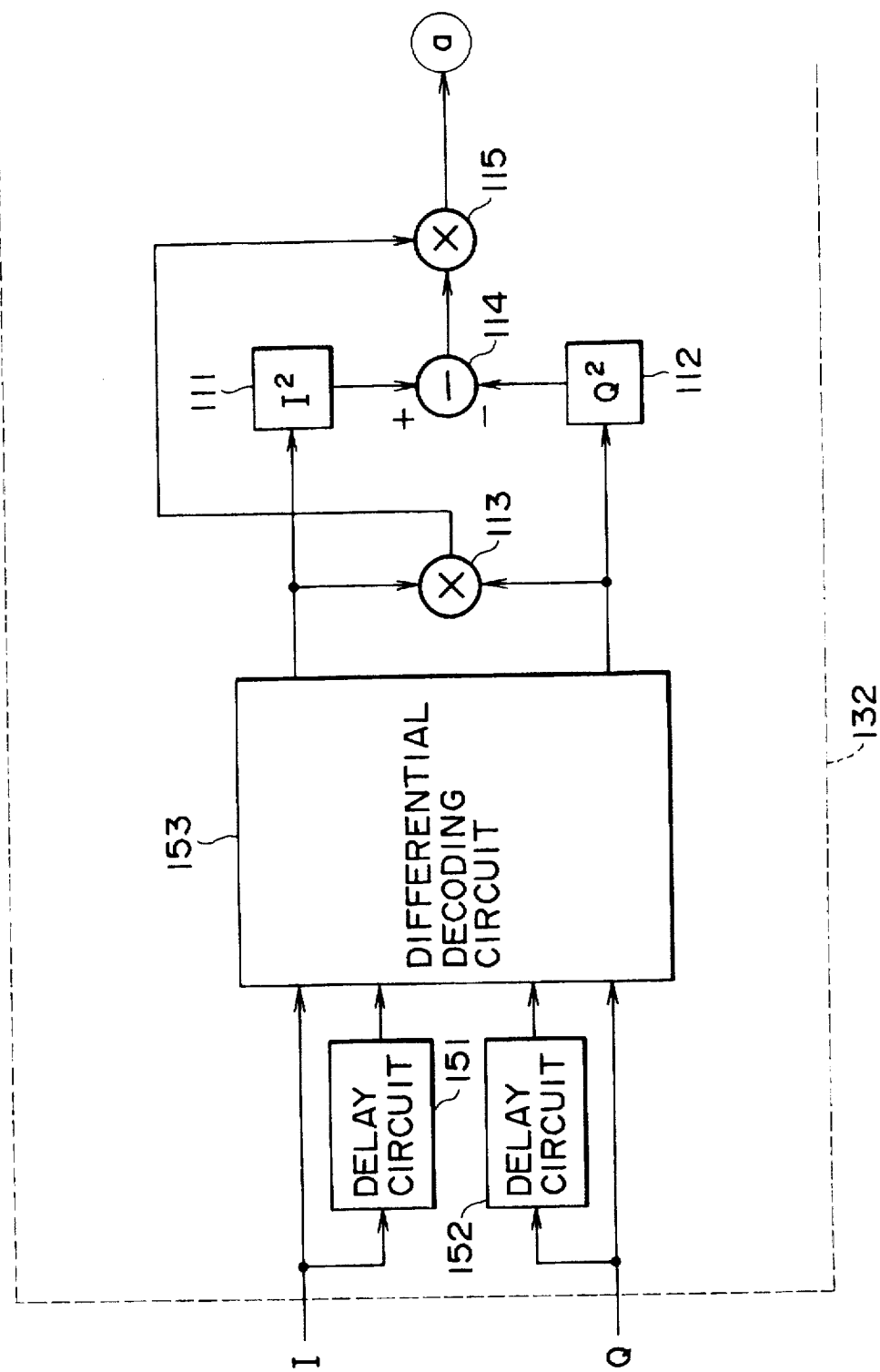
FIG. 13 (13A–13B) is a block diagram showing an example of the structure of the clock regenerating circuit 132 of FIG. 11.

Next, FIG. 13 shows an example of the structure of the clock regenerating circuit 132. In FIG. 13, the elements like those in FIG. 9 are designated by the like reference numerals. Namely, the clock regenerating circuit 132 is formed in the same manner as the clock regenerating circuit 49 of FIG. 9, except for that the delay circuits 151 and 152, differential decoding circuit 153 are newly provided.

The delay circuits 151, 152 or differential decoding circuit 153 are formed in the same manner as the delay circuits 91, 92 or the differential decoding circuit 93 in FIG. 4.

Therefore, in the clock regenerating circuit 132, the I and Q data are differentially decoded in the differential decoding circuit 153 and thereby the differentially decoded I data is supplied to the square circuit 111 and multiplier 113, while the differentially decoded Q data is supplied to the square circuit 112 and multiplier 113.

In the same manner as explanation in regard to FIG. 9, a difference between the total sum of the phase error detecting signals of all carriers of positive frequency forming one OFDM symbol and the total sum of the phase error detecting signals of all carriers of negative frequency forming one OFDM symbol is fed back to the clock generator 50 and thereby the clock matching with that in the transmitting side can be regenerated.

Next, the square circuits 61, 62, multiplier 63, subtracter 64, multiplier 65, delay circuits 141, 142 or differential decoding circuit 143 of the carrier regenerating circuit 131 shown in FIG. 12 are formed in the same manner as the square circuits 111, 112, multiplier 113, subtracter 114, multiplier 115, delay circuits 151, 152 or differential decoding circuit 153 of the clock regenerating circuit shown in FIG. 13. Therefore, the carrier regenerating circuit 131 and clock regenerating circuit 132 are formed integrally as the common circuit as in the case of FIG. 10.

Figure 14A:
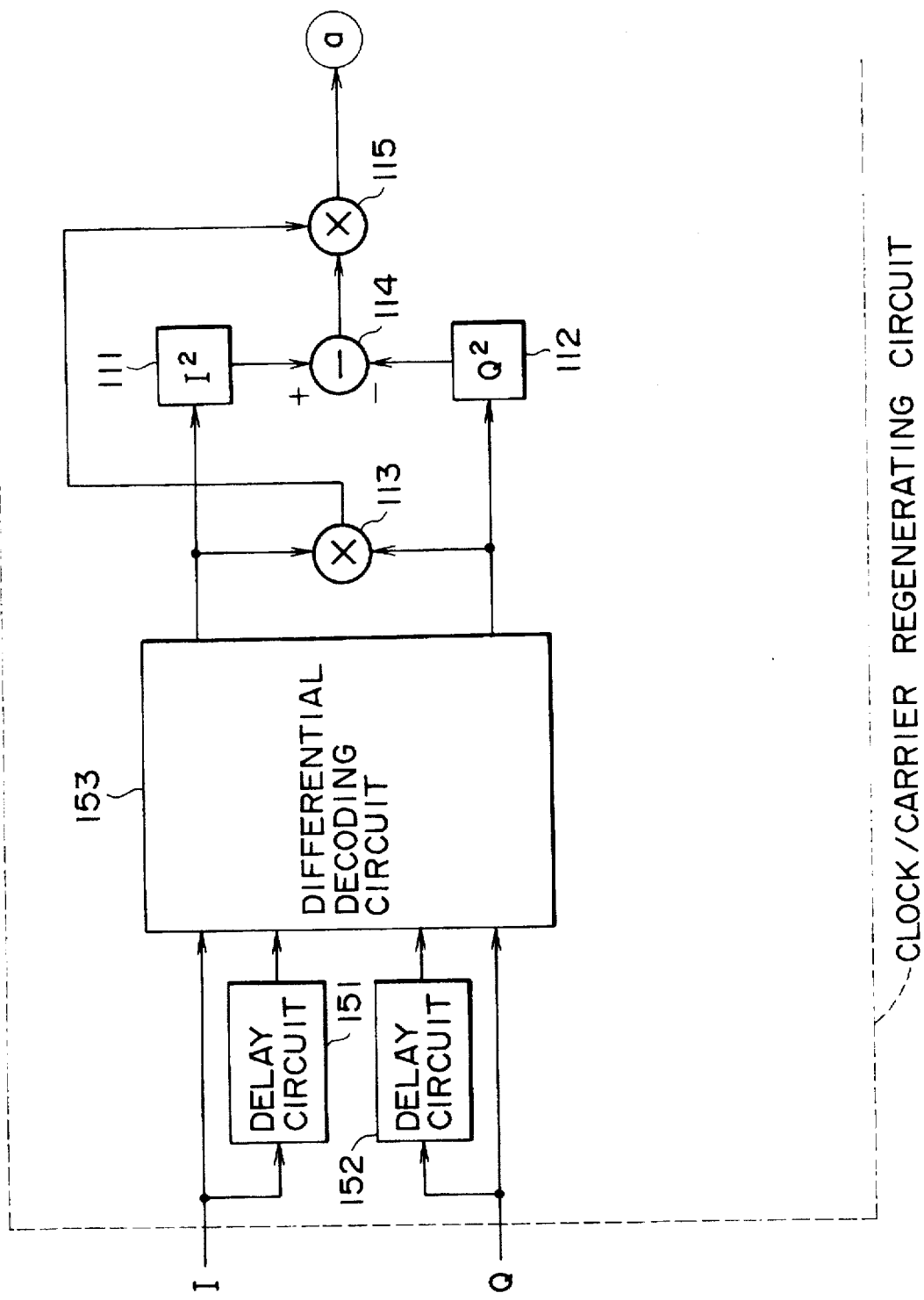
FIG. 14 (14A–14B) is a block diagram showing an example of the structure of a clock/carrier regenerating circuit integrating the carrier regenerating circuit 131 of FIG. 12 and the clock regenerating circuit 132 of FIG. 13.

FIG. 14 shows an example of the structure of the clock/carrier regenerating circuit integrating the carrier regenerating circuit 131 and clock regenerating circuit 132. In FIG. 14, the elements like those in FIG. 10 are designated by the like reference numerals. Namely, this clock/carrier regenerating circuit is formed in the same manner as the clock/carrier regenerating circuit of FIG. 10, except for that the delay circuits 151, 152 and differential decoding circuit 153 are newly provided.

Accordingly, in this clock/carrier regenerating circuit, the I and Q data are differentially decoded in the differential decoding circuit 153 and thereby the differentially decoded I data is supplied to the square circuit 111 and multiplier 113, while the differentially decoded Q data is supplied to the square circuit 112 and multiplier 113.

In the same manner as in the case of FIG. 10, the local oscillators 47 and 50 are controlled.

Therefore, the clock and carrier matching with those in the transmitting side can be regenerated also by using the clock/carrier regenerating circuit of FIG. 14, in place of the carrier regenerating circuit 131 and clock regenerating circuit 132. Moreover, in this case, the receiver can be formed small in size at a low cost.

In this embodiment, a value corresponding to phase error generated by mismatching of the carrier or clock is obtained by utilizing the phase errors of all carriers forming one OFDM symbol, but it is also possible obtain the value corresponding to the phase error generated by mismatching of carrier or clock using a plurality of phase errors in place of all carriers forming one OFDM symbol. However, in this case, as a plurality of carriers, a pair of carriers of positive frequency and negative frequency of the equal absolute value must be sued (when the phase error E(n) is used, E(-n) must also be used). Moreover, in this embodiment, transmission by the QPSK modulation has been explained but the structures of the carrier regenerating circuit and clock regenerating circuit may be realized with the same structures as those used for transmission by the multilevel modulation system.

As described above, according to the present invention, the OFDM modulated signal is converted into the OFDM signal of the baseband to calculate a phase difference between the phase of carrier forming OFDM signal and the phase of carrier before one OFDM symbol. Based on the phase difference of carrier, the phase error of carrier is calculated, while based on the phase errors of a plurality of carriers forming the OFDM signal, the reference signal required for demodulation can be regenerated. Therefore, the carrier and the reference signal such as clock, for example, can be regenerated with higher accuracy because deterioration of S/N of phase error resulting from the frequency selective Rayleigh fading can be reduced.

What is claimed is:

1. A receiver for receiving an orthogonal frequency division multiplexed (OFDM) modulated signal, comprising:

receiving means for receiving said OFDM modulated signal;

demodulating means for demodulating said received OFDM modulated signal to generate a baseband OFDM signal;

phase difference detecting means for outputting a phase difference information between the phase of the carrier forming said baseband OFDM signal and the phase of the carrier forming a temporally preceding baseband OFDM signal;

adding means for adding the phase difference information as determined by said phase difference detecting means for a plurality of baseband OFDM signals; and reference signal generating means for generating a reference signal used for demodulation of said OFDM modulated signal based on an output from said adding means.

2. The receiver recited in claim 1, further comprising converting means for performing a discrete Fourier transform on an output of said demodulating means, wherein said phase difference detecting means obtains the phase difference information based on an OFDM signal outputted from said converting means.

3. The receiver recited in claim 2, wherein said phase difference detecting means outputs a signal proportional to $\sin(4\phi)$ for the phase difference $\phi$.

4. The receiver recited in claim 2, wherein said demodulating means includes at least a local oscillator and said reference signal generating means generates a control signal for controlling said local oscillator.

5. The receiver recited in claim 4, wherein said demodulating means further comprises:

a phase shifter for shifting an output of said local oscillator by 90 degrees;

a first multiplier for multiplying an output of said local oscillator with an output of said receiving means; and a second multiplier for multiplying an output of said phase shifter with an output of said receiving means.

6. The receiver recited in claim 5, wherein said adding means adds the phase difference information of all carriers forming one OFDM symbol.

7. The receiver recited in claim 2, wherein said converting means includes at least an A/D converter for converting an output of said demodulating means into a digital signal and a clock signal generator for generating a clock signal for said A/D converter, and wherein said reference signal generating means generates a control signal supplied to said clock signal generator.

8. The receiver recited in claim 7, wherein said adding means comprises:

a first adder for adding phase difference information for carriers having a frequency higher than a reference carrier frequency; and a second adder for adding phase difference information for carriers having a frequency lower than said reference carrier frequency, said reference signal generating means generates said control signal to be supplied to said clock signal generator from a difference between outputs of said first and second adders.

9. A method of generating a reference signal used in a receiver that receives an orthogonal frequency division multiplexed (OFDM) modulated signal, comprising the steps of:

receiving said OFDM modulated signal;

demodulating said received OFDM modulated signal to generate a baseband OFDM signal;

performing a discrete Fourier transform on said baseband OFDM signal to generate a converted signal;

calculating a phase difference between the phase of the carrier forming said converted signal and the phase of the carrier forming a temporally preceding converted signal;

adding phase difference information as determined by said calculating step for a plurality of converted signals; and generating a reference signal based on said added phase difference information.

10. The method recited in claim 9, wherein the step of calculating further comprises calculating a value proportional to $\sin(4\phi)$ for the phase difference $\phi$.

11. The method recited in claim 10, wherein said reference signal includes a control signal for controlling a local oscillator.

12. The method recited in claim 10, wherein said reference signal includes a clock signal that is supplied to an A/D converter.

13. The method recited in claim 12, wherein said step of adding phase difference information comprises the steps of:

adding phase difference information for carriers having a frequency higher than a reference carrier frequency to generate a first partial sum; and adding phase difference information for carriers having a frequency lower than said reference carrier frequency to generate a second partial sum.

* * * * *